(12) United States Patent
Cherian et al.

(10) Patent No.: US 11,582,485 B1
(45) Date of Patent: Feb. 14, 2023

(54) SCENE-AWARE VIDEO ENCODER SYSTEM AND METHOD

(71) Applicant: Mitsubishi Electric Research Laboratories, Inc., Cambridge, MA (US)

(72) Inventors: Anoop Cherian, Cambridge, MA (US); Chiori Hori, Lexington, MA (US); Jonathan Le Roux, Arlington, MA (US); Tim Marks, Middleton, MA (US); Alan Sullivan, Middleton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/650,114

(22) Filed: Feb. 7, 2022

Related U.S. Application Data

(60) Provisional application No. 63/288,096, filed on Dec. 10, 2021.

(51) Int. Cl.
| | |
|---|---|
| *H04N 19/597* | (2014.01) |
| *H04N 19/179* | (2014.01) |
| *H04N 19/107* | (2014.01) |
| *G06F 16/532* | (2019.01) |
| *G06T 7/11* | (2017.01) |
| *G06V 30/194* | (2022.01) |
| *H04N 21/25* | (2011.01) |

(52) U.S. Cl.
CPC ......... *H04N 19/597* (2014.11); *G06F 16/532* (2019.01); *G06T 7/11* (2017.01); *G06V 30/194* (2022.01); *H04N 19/107* (2014.11); *H04N 19/179* (2014.11); *H04N 21/251* (2013.01)

(58) Field of Classification Search
CPC ... H04N 19/597; H04N 19/107; H04N 19/179
See application file for complete search history.

(56) References Cited

U.S. PATENT DOCUMENTS

| | | | | |
|---|---|---|---|---|
| 2012/0219174 | A1* | 8/2012 | Wu | G06T 7/215 382/103 |
| 2020/0074185 | A1* | 3/2020 | Rhodes | G06F 17/18 |
| 2022/0048530 | A1* | 2/2022 | Wyffels | G06V 20/56 |

* cited by examiner

*Primary Examiner* — Richard T Torrente
(74) *Attorney, Agent, or Firm* — Gennadiy Vinokur; Hironori Tsukamoto

(57) ABSTRACT

Embodiments of the present disclosure discloses a scene-aware video encoder system. The scene-aware encoder system transforms a sequence of video frames of a video of a scene into a spatio-temporal scene graph. The spatio-temporal scene graph includes nodes representing one or multiple static and dynamic objects in the scene. Each node of the spatio-temporal scene graph describes an appearance, a location, and/or a motion of each of the objects (static and dynamic objects) at different time instances. The nodes of the spatio-temporal scene graph are embedded into a latent space using a spatio-temporal transformer encoding different combinations of different nodes of the spatio-temporal scene graph corresponding to different spatio-temporal volumes of the scene. Each node of the different nodes encoded in each of the combinations is weighted with an attention score determined as a function of similarities of spatio-temporal locations of the different nodes in the combination.

20 Claims, 16 Drawing Sheets

| Method | Accuracy (%)↑ |
|---|---|
| Spatio-Temporal VQA | 47.94 |
| Co-Memory-QA | 48.04 |
| Hier. Relation n/w | 48.20 |
| Multi-modal Attn VQA | 48.72 |
| graph-alignment VQA | 49.74 |
| spatio-temporal transformer | 53.40 |

| Method | Mean Rank ↓ |
|---|---|
| Question Only | 7.63 |
| Multimodal Transformers | 7.23 |
| Question + Video | 6.98 |
| MTN | 6.85 |
| ST Scene Graphs | 5.91 |
| spatio-temporal transformer | 5.84 |

| Method | NExT-QA Acc (%)↑ | AVSD-QA mean rank↓ |
|---|---|---|
| No dynamic graph | 52.49 | 5.97 |
| No static graph | 53.00 | 6.03 |
| No I3D | 52.65 | 6.09 |
| No hier. kernel | 52.90 | 5.97 |
| No ans. augment | 49.98 | 5.92 |
| No question condition | 50.39 | 5.96 |
| Full Model | 53.40 | 5.84 |

708

| | AVSD-QA | NExT-QA |
|---|---|---|
| Full graph | 502.43 | 656.30 |
| Static graph | 97.26 | 68.68 |
| Dynamic graph | 136.10 | 430.83 |
| % node reduction | 53.6 | 23.9 |

712

| Method | Accuracy (%)↑ |
|---|---|
| (2.5+1)D-Transformer | 53.40 |
| (2.5+1)D-Transformer + all nodes | 53.50 |

SCENE-AWARE VIDEO ENCODER SYSTEM AND METHOD

TECHNICAL FIELD

The present invention relates generally to video scene aware recognition, and more particularly to scene-aware video encoder system and method.

BACKGROUND

Nowadays, machines are built with the potential to interact with humans about objects and events in an environment that are captured in a video. For such interaction with the humans, the machines may be equipped with effective models of dynamic audio-visual scenes to infer about the objects and events from a scene of the video. Such dynamic audio-visual scene models correspond to a multi-modal reasoning problem, e.g., a video-based reasoning problem. Typically, visual scene graphs are used as data structures for video-based reasoning and such visual scene graphs are constructed for each video frame of the video. However, given the fact that videos are essentially sequences of 2D "views" of events happening in a 3D space, the need to have visual scene graphs for every frame may be redundant. The redundancy in the visual scene graphs may become computationally detrimental for longer video sequences.

Further, the visual scene graphs may lack insight that the video represents sequences of two-dimensional (2D) "views" of events happening in a three-dimensional (3D) space. The lack of such insight (i.e., 3D information) may fail to capture spatio-temporal information that flows through each video frame of the video. The spatio-temporal information provides semantics of a 3D scene flowing through frame-to-frame of the video. Furthermore, in some cases, objects in the video may be occluded, and that may impact the visual scene graphs in capturing information (such as spatial/location information) of the objects. The visual scene graphs may include lesser information due to the occlusion of objects that may cause outputting inaccurate outcome for the video-based reasoning.

Accordingly, there is a need to overcome the above-mentioned problems. More specifically, there is a need to generate visual scene graphs in an efficient and feasible manner, while outputting accurate results for video-based reasoning.

SUMMARY

Some embodiments are based on the realization that a video includes two-dimensional (2D) views of a three-dimensional (3D) space in which various events occur temporally and a scene of the video may be represented in a four-dimensional (4D) spatio-temporal space to avoid visual scene graph-based representational redundancies. The 4D space comprises three dimensions of space with the fourth dimension being time. Further, some embodiments are based on the understanding that object properties such as permanence may be handled in a 3D space in an efficient manner, as each object (i.e., an object visible in some video frames) obtains a location therein, thereby disentangling camera views from its spatial location. As a result, some embodiments propose usage of the 3D representation of the scene which leads to avoiding occlusions, which is a significant problem when working with 2D scene graphs. Furthermore, typically, spatio-temporal scene-graphs are constructed for every video frame of the video for spatio-temporal scene-graph approaches to video-based reasoning tasks such as video question-answering (QA). However, the spatio-temporal scene-graph approaches may lack the insight that the videos represent sequences of two-dimensional (2D) "views" of events happening in a three-dimensional (3D) space. The spatio-temporal scene-graph approaches may also fail to capture spatio-temporal information, i.e., semantics of a 3D scene through frame-to-frame of the videos.

To that end, it is an object of some embodiments to provide a scene-aware video encoder system and method. It is also an object of some embodiments to capture the spatio-temporal information of the video. In some example embodiments, key frames may be extracted from the video for capturing the spatio-temporal information. The key frames may be extracted using key frame extraction methods, such as cluster-based key frame extraction, visual-based key frame extraction, motion analysis based key frame extraction or the like. In some other example embodiments, the key frames may be extracted based on features of models trained on datasets, e.g., VisualGenome dataset. For example, key frames of a soccer sports video may be extracted based on features extracted from datasets that include players in soccer field, soccer ball with the players, or the like. In some embodiments, the key frames may be extracted by discarding redundant video frames of the video.

In some example embodiments, each frame of the video may be transformed into a pseudo 3D structure, such as a 2.5D spatio-temporal scene graph for the scene to capture the spatio-temporal information in a 3D structure of the video frames. In this manner, graph nodes of the 2.5D scene graph are mapped to a shared 3D space coordinate frame. Such a 2.5D reconstruction of the scene to impart an approximate 3D location for each graph node, generates a spatio-temporal scene graph, i.e., a (2.5+1)D scene graph. In some embodiments, the spatio-temporal scene graph is generated by registering the 2.5D scene graph of corresponding video frame into a shared (2.5+1)D spatio-temporal space.

However, despite the registration of the 2.5D scene graph into the (2.5+1)D spatio-temporal space, each graph is still specific to a video frame, and may not be registered to a shared space. The (2.5+1)D spatio-temporal space-based registration may be confounded by the fact that objects in the scene may move from one frame to another frame. To this end, the spatio-temporal scene graph may be segregated into a static sub-graph and a dynamic sub-graph based on motion of objects in the scenes. In particular, the segregation of the spatio-temporal scene graph depends on whether an underlying graph node of the spatio-temporal scene graph belonging to a class usually moves in a scene. For instance, in some cases, a graph node may correspond to a dynamic object class, such as a person class moving in the scene. In some cases, a graph node may correspond to a static object class, such as a table class that is considered static in the scene.

After the segregation, graph nodes of the static sub-graph are merged and graph nodes of the dynamic 2.5D sub-graph are retained from the original spatio-temporal scene graph. In some embodiments, two graph nodes of the static sub-graph may be merged based on a criterion that their 3D spatial proximity across frames of the video are nearby, corresponding objects of the two graph nodes have same object label, and intersection of corresponding bounding boxes of the objects is above a pre-defined threshold. The merging of such graph nodes of the static sub-graph removes redundant graph nodes, i.e., copies of static objects in the static sub-graph. In some embodiments, the graph nodes in the dynamic sub-graph may be enriched with motion features capturing their interactions with other graph nodes. The dynamic sub-graph nodes may capture the frame-level semantics, as well as object actions (e.g., person picking a cup) as each dynamic graph node is enriched with motion features along with corresponding object-level feature representation.

The spatio-temporal scene graph representation may summarize a spatio-temporal activity occurring in a scene in a computationally efficient framework. In some embodiments, the scene graph representation may be used to develop rich inference schemes for a visual question-answering (VQA) task. For example, an interaction of a person with a static object in a scene of a video may be captured by attending regions in the spatio-temporal scene graph where spatio-temporal proximity between the respective graph nodes is minimized.

To that end, the spatio-temporal scene graph may be embedded based on a hierarchical latent embedding. The hierarchical latent embedding may construct graph edges of the spatio-temporal scene graph via varied spatio-temporal proximities. The construction of the graph edges using the varied spatio-temporal proximities may capture latent embeddings of the spatio-temporal scene graph at multiple granularities (for example, at different resolutions). Such embedded spatio-temporal scene graph may be used within a transformer reasoning pipeline of the VQA task that is conditioned on VQA questions to retrieve an appropriate answer of a query for the video.

In some embodiments, to semantically represent the interaction of the objects in the dynamic sub-graph, features of the static and dynamic objects may be embedded in a latent space. To that end, different combinations of different nodes (i.e., the static and dynamic objects) of the spatio-temporal scene graph may be selected using a window sliding method of different spatio-temporal volumes with different spatio-temporal resolutions. Further, similarity of the different combinations may be using a similarity kernel, such as a spatio-temporal kernel, a string kernel, a graph kernel, or the like. The similarity kernel captures features of graph nodes in the spatio-temporal scene graph that are spatio-temporally nearby. In some embodiments, similarity kernels for the different combinations of different nodes may be computed for determining a similarity between the different combinations of different nodes of the spatio-temporal scene graph. The similarity kernels are merged using a series of multi-layer perceptrons (MLPs). The series of MLPs output a single feature representation as final graph features of the spatial-temporal scene graph. Such final graph features may be used for the VQA task.

In some embodiments, the spatio-temporal scene graph encoded in the latent space may be used to decode a transcription of the video of the scene. The transcription of the video may be decoded from the latent space using a decoder trained with the spatio-temporal transformer. The decoder may receive a query corresponding to the video. In some embodiments, embeddings of the query may be generated using multi-headed self-attention. The multi-headed self-attention may attend the query based on hierarchical abstraction of the spatio-temporal scene graph. In particular, the query may be attended using a multi-headed cross attention transformer. After the query, the embeddings may be pooled using a pooling technique, such as an average pooling of the embeddings to output query-conditioned features for the query. The query-conditioned features may be used to predict an answer for the query. The predicted answer may be a representative of embeddings of a set of candidate answers (that includes a ground truth answer). In some embodiments, the decoder may be trained based on a cross-entropy loss between the predicted answer and the ground truth answer.

Accordingly, one embodiment discloses a scene-aware video encoder system, which includes at least one processor; and a memory having instructions stored thereon that, when executed by at least one processor, cause the scene-aware video encoder system to receive a sequence of video frames of a video of a scene; transform the sequence of video frames into a spatio-temporal scene graph including nodes representing one or multiple static and dynamic objects in the scene, wherein an appearance and a location of each of the static objects in the scene are represented by properties of a single node of the spatio-temporal scene graph, and wherein each of the dynamic objects in the scene is represented by properties of multiple nodes of the spatio-temporal scene graph describing an appearance, a location, and a motion of each of the dynamic objects at different instances of time; encode the nodes of the spatio-temporal scene graph into a latent space using a spatio-temporal transformer encoding different combinations of different nodes of the spatio-temporal scene graph corresponding to different spatio-temporal volumes of the scene, wherein encoding of each node of the different nodes in each of the combinations is weighted with an attention score determined as a function of similarities of spatio-temporal locations of the different nodes in the combination; and output the encoded nodes of the spatio-temporal scene graph.

Another embodiment discloses a method for a scene-aware video encoding, wherein the method includes receiving a sequence of video frames of a video of a scene. The method includes transforming the sequence of video frames into a spatio-temporal scene graph including nodes representing one or multiple static and dynamic objects in the scene. An appearance and a location of each of the static objects in the scene are represented by properties of a single node of the spatio-temporal scene graph, and each of the dynamic objects in the scene is represented by properties of multiple nodes of the spatio-temporal scene graph describing an appearance, a location, and a motion of each of the dynamic objects at different instances of time. The method includes encoding the nodes of the spatio-temporal scene graph into a latent space using a spatio-temporal transformer encoding different combinations of different nodes of the spatio-temporal scene graph corresponding to different spatio-temporal volumes of the scene, wherein encoding of each node of the different nodes in each of the combinations is weighted with an attention score determined as a function of similarities of spatio-temporal locations of the different nodes in the combination. The method further includes outputting the encoded nodes of the spatio-temporal scene graph.

BRIEF DESCRIPTION OF THE DRAWINGS

FIG. 7A shows an evaluation study for the VQA task using the scene-aware video encoder system, according to some embodiments of the present disclosure.

FIG. 7B shows an ablation study for the scene-aware video encoder system, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

System Overview

Figure 1:
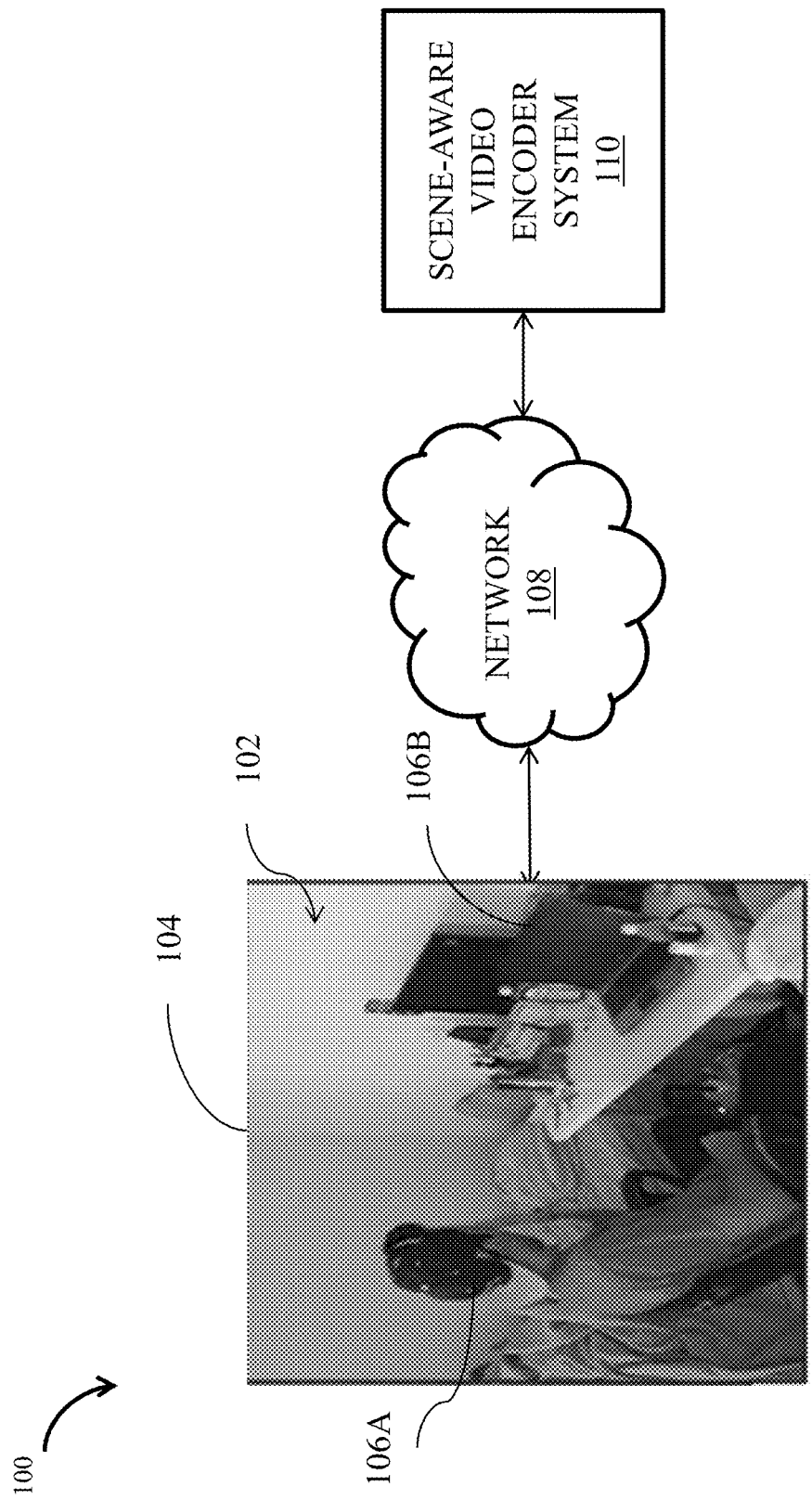
FIG. 1 shows a representation of an environment for a scene-aware video encoder system, according to some embodiments of the present disclosure.

FIG. 1 shows a representation of an environment 100 for a scene-aware video encoder system 110, according to some embodiments of the present disclosure. In an illustrative example scenario, a scene 102 in a video 104 may include different objects that may be static or dynamic. For instance, the scene 102 includes an object 106A and an object 106B. The object 106A may correspond to a dynamic object, such as a person moving in the scene 102 and the object 106B may correspond to a static object, such as a laptop that remains static on a table in the scene 102. Such a scene 102 of the video 104 may be processed by the scene-aware video encoder system 110. In some example embodiments, processing the scene 102 may comprise providing a transcription of the video of the scene 102 and/or providing a response to a query pertaining to the scene 102. The scene-aware video encoder system 110 includes a processor 112 and a memory 114. The memory 114 is configured to store instructions that are executed by the processor 112. In some example embodiments, the scene-aware video encoder system 110 may be embodied as a standalone system or may be part of another computing system.

The process for processing the video 104 by the processor 112 of the scene-aware video encoder system 110 is further explained next with reference to FIG. 2A.

Figure 2A:
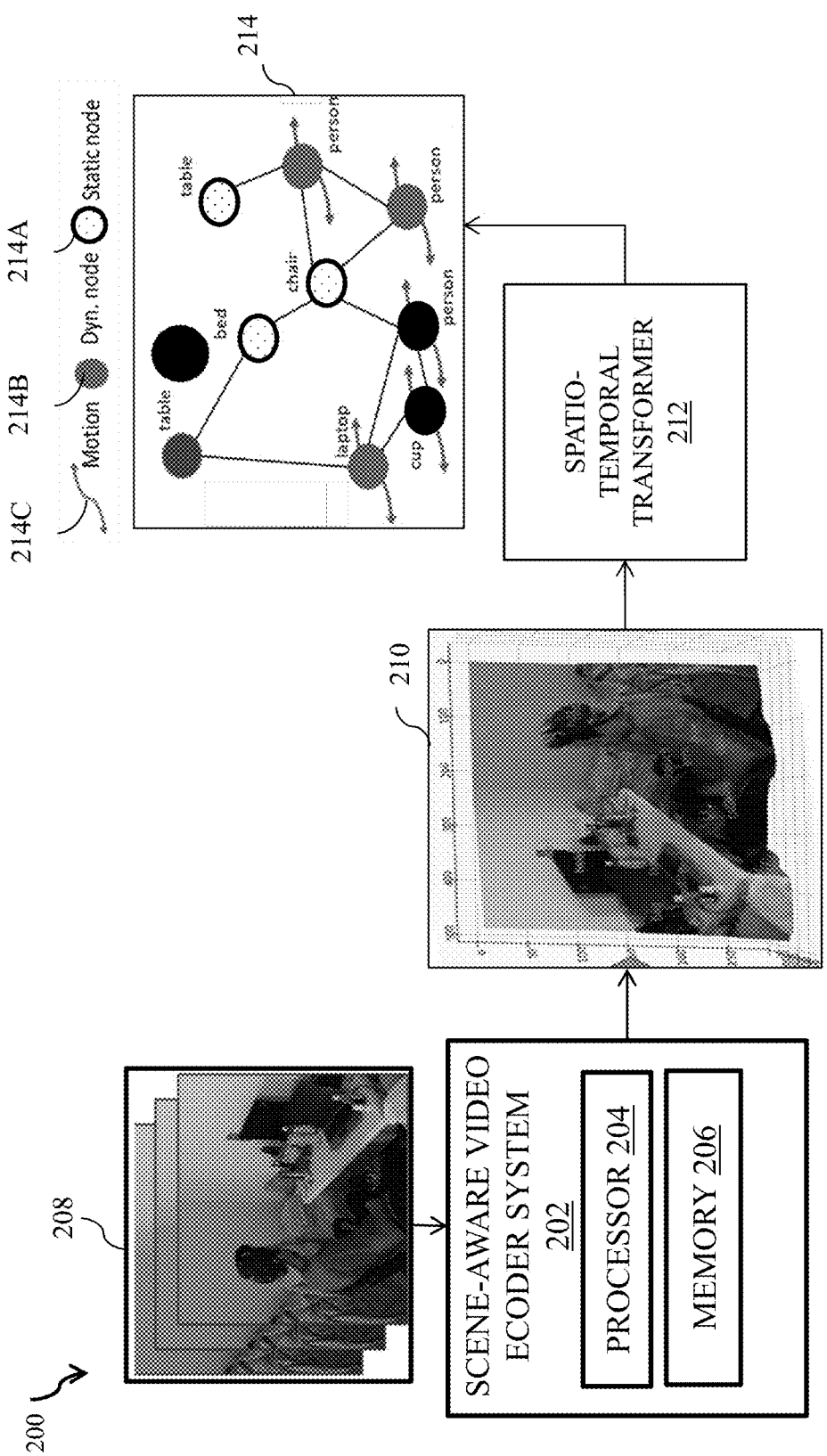
FIG. 2A shows a schematic diagram of a scene-aware video analysis system, according to some embodiments of the present disclosure.

FIG. 2A shows a schematic diagram 200 of a scene-aware video encoder system 202, according to some embodiments of the that are executed by the processor 204. The processor 204 is configured to receive a sequence of video frames 208 (interchangeably referred to hereinafter as video frames 208). The sequence of video frames 208 corresponds to the video 104 of the scene 102. In some example embodiments, the sequence of video frames 208 may be received via a network, such as the network 108. present disclosure. The scene-aware video encoder system 202 corresponds to the scene-aware video encoder system 110 of FIG. 1. The scene-aware video encoder system 202 includes a processor 204 and a memory 206. The memory 206 stores instructions The received sequence of video frames 208 are pre-processed to output a pre-processed sequence of video frames 210. The pre-processed sequence of video frames 210 includes objects detected in the video frames 208 as well as depth information of the objects in the video frames 208. In some embodiments, the video frames 208 may be pre-processed using an object detection model for object detection in each of the video frames 208 and a neural network model for depth information estimation.

In some example embodiments, the object detection model may include a Faster Region Convolutional Neural Network (FRCNN) object detection model. The FRCNN object detection model may be pre-trained to detect objects in the video frames 308. In some example embodiment, the FRCNN object detection model may be pre-trained based on a training dataset, such as Visual Genome dataset. The training dataset may be a broad array of daily-life indoor and outdoor objects. In each video frame, the FRCNN object detection model detects 'm' objects in the video frames 208.

In some example embodiments, the neural network model (denoted as D: $R^{h \times w \times 3} \rightarrow R^{h \times w \times 4}$) may be implemented using an off-the-shelf pre-trained 2D-to-3D deep learning framework. The 2D-to-3D deep learning framework may correspond to a MiDAS model for estimating a realistic depth for a variety of real-world scenes in an efficient and feasible manner. The neural network model receives each of the sequence of video frames 208 as a Red, Green, Blue (RGB) image and outputs corresponding RGBD image of each of the video frames 208. For instance, a video frame is an RGB image (I), and corresponding depth information of the RGB image is, $d_f: R^2 \rightarrow R^3$ that maps a 2D pixel location (x, y) to a respective 3D coordinate, denoted p=(x, y, z).

The RGBD images of the video frames 208 outputted by the neural network model, and the detected objects of the video frames 208 outputted by the object detection model are combined to output the pre-processed sequence of video frames 210. The pre-processed sequence of video frames 210 is inputted to a spatio-temporal transformer 212.

The spatio-temporal transformer 212 transforms each of the video frames 208 into a spatio-temporal scene graph 214 (G) of the video frames 208 to capture spatio-temporal information of the video frames 208. The spatio-temporal scene graph 214 (G) for the sequence video frames 208 (S) with a length of 'n' video frames may be represented as G=(V, E), where $V=V_1 \cup V_2 \cup \ldots \cup V_n$ denotes a set of nodes, each $V_t$ denotes a subset of nodes associated with frame t, and $E \subseteq V \times V$ denotes set of graph edges. The spatio-temporal scene graph 214 is a pseudo 3D-structure, such as a 2.5D structure that includes nodes representing the detected objects 'in' of the video frames 208. In particular, each of the 'in' objects is represented by a graph node 'v' that contains a tuple of FRCNN outputs $(f_v^o, cv, bbox_v)$ of the FRCNN object detection model, where $f_v$ is the object's neural representation, $c_v$ is corresponding label of an object in the training database, and $bbox_v$ denotes corresponding bounding box coordinates relative to corresponding video frame of the sequence of video frames 208. Thus, for the sequence of video frames 208 with 'n' video frames, the spatio-temporal scene graph 214 includes 'mn' graph nodes. The graph nodes of the spatio-temporal scene graph 214 are encoded into a latent space by the spatio-temporal transformer 212.

The graph nodes of the spatio-temporal scene graph 210 includes one or multiple static nodes 214A and one or multiple dynamic nodes 214B. The one or multiple static nodes 214A represent corresponding static objects (e.g., the object 108B) in the video frames 208. The one or multiple dynamic nodes 214B represent corresponding dynamic objects (e.g., the object 106A) in the video frames 208. The one or multiple dynamic nodes 214B includes motion features 214C that represent information of movement of the dynamic nodes 214B. In some example embodiments, the motion features 214C are extracted from the dynamic graph nodes of the spatio-temporal scene graph using an action recognition model, e.g., an Inflated 3D networks (I3D) action recognition model.

In the spatio-temporal scene graph 214 each of the graph nodes (static or dynamic) has properties that represent the corresponding object. For instance, a static graph node has properties that represent an appearance and a location of a corresponding static object. Likewise, a dynamic graph node has properties representing an appearance, a location and a motion of corresponding dynamic object at different instances of time.

For a graph node $v \in V_t$ extracted from a video frame at a time instance t (i.e., an image $I_t$), let $bbox_v$ denotes a centroid of the node's detected bounding box. To enrich the spatio-temporal scene graph 214 with (2.5+1)D spatio-temporal information, representation of the graph node (v) is incorporated with depth and time information. The depth and time information is incorporated to the graph node (v) by updating the tuple for the graph node (v) as $(f_v^o, c_v, bbox_v, p_v, t)$, where $p_v = d_{f_t} \overline{bbox_v}$ is interpreted as a 3D centroid of the bounding box. The enriched spatio-temporal scene graph 214 is denoted as $G_{3.5D}$ graph.

Further, from the spatio-temporal scene graph 214 ($G_{3.5D}$ graph), graph nodes that correspond to the static objects are pruned to remove redundant or copy of the graph nodes, which is described next in FIG. 2B.

Figure 2B:
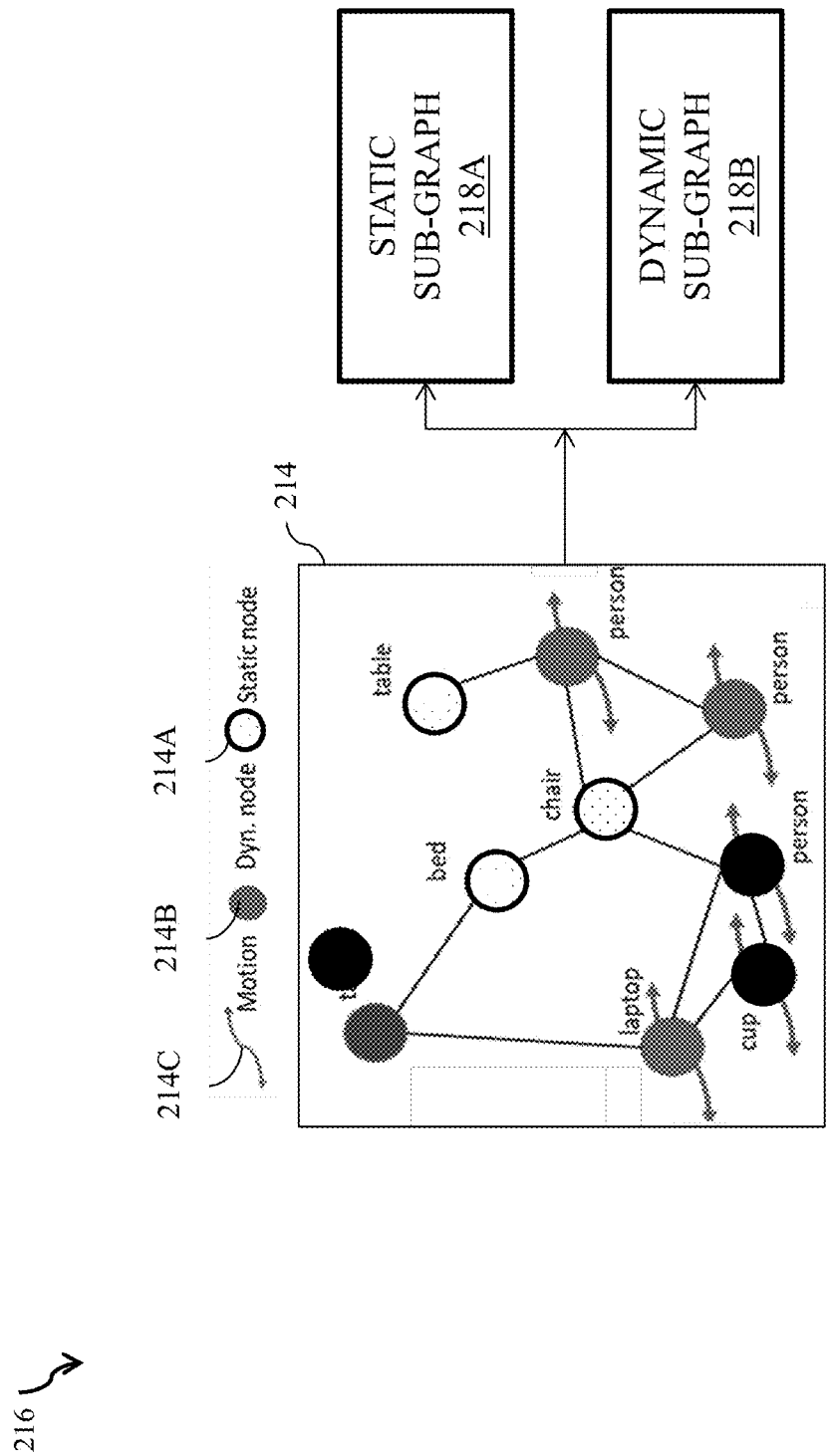
FIG. 2B shows a representation for segregation of the spatio-temporal scene graph, according to some embodiments of the present disclosure.

FIG. 2B shows a representation 216 for segregation of the spatio-temporal scene graph 214, according to some embodiments of the present disclosure. In some example embodiments, the spatio-temporal scene graph 214 may be segregated based on the class segregation of the objects. The class segregation may correspond to the segregation of a training dataset (e.g., the training dataset of the FRCNN object detection model) into two categories. The two categories may include a category of static objects ($C_s$) and a category of dynamic objects ($C_d$). The category of static scene objects ($C_s$) may correspond to objects, such as a table, sofa, television, etc. The category of dynamic scene objects ($C_d$) may correspond to objects, such as people, mobile, football, clouds, etc. To that end, the spatio-temporal scene graph 214 is split into a static sub-graph 218A ($G_s$) and a dynamic sub-graph 218B ($G_d$) corresponding to whether an object label ($C_v$) of a graph node $v \in V$ belongs to $C_s$ or $C_d$. The static sub-graph 218A includes graph nodes belonging to the category of static scene objects ($C_s$), while the dynamic sub-graph 218B includes graph nodes belonging to the category of dynamic scene objects ($C_d$).

In some embodiments, the enriched spatio-temporal scene graph 214 graph ($G_{3.5D}$) is registered in a shared 3D space. In some embodiments, features for the registration are extracted from the graph nodes of the static sub-graph 218A (referred to hereinafter as static graph nodes) features for registration are extracted. The registration features are extracted from the static subgraph nodes to tackle problems due to motion of objects in the video frames 208, and/or problems due to motion of a camera capturing the video frames 208. Specifically, if there is camera motion, then there may be a frame-to-frame 3D projection matrix using point features. The projection matrix may be used to spatially map all the graph nodes (including both the static and the dynamic graph nodes) of the enriched spatio-temporal scene graph 214 into a common coordinate frame.

Some embodiments are based on realization that bounding boxes that define objects in the static nodes may be imprecise. To that end, a criterion (C) to merge two static nodes may be checked. The criterion (C) may include checking whether the static nodes are from frames that are sufficiently close in time, with the same object labels, and with the intersection over union (IoU) of their bounding boxes above a threshold γ. In particular, two nodes (vt, vt'∈Gs) of the enriched graph, from frames with timestamps (t≠t') such that (|t−t'|<δ), are candidates for merging if the following criterion (C) is met:

$$C(v_t, v_{t'}) := (c_{v_t} = c_{v_{t'}}) \wedge \text{IoU}(bbox_{v_t}, bbox_{v_{t'}}) > \gamma \quad (1)$$

If a static graph node $v_t$ of the static sub-graph 218A has multiple candidate nodes in previous δ frames of the video frames 208 that satisfy the criterion (1), the candidate node with the nearest 3D centroid is selected as the matching node is merged:

$$\text{match}(v_t) = v_{t'} \in V_{t-\delta}^s \cup \ldots \cup V_{t-1}^s \underset{\text{such that } C(v_t, v_{t'}) = 1}{\arg\min} \|p_{v_t} - p_{v_{t'}}\| \quad (2)$$

where, $V_t^s = \{v_t \in V_t | v_t \in G_s\}$ denotes a set of all static nodes from frame t. The equation (2) selects a best match from previous δ frames that overcomes noise in estimation of the depth information and the bounding boxes associated with the graph nodes. In some example embodiments, the equation (2) may be recursively applied to the enriched graph to determine larger equivalence classes of matched nodes to be merged. An equivalence class may be defined as a set of all nodes that share a single common node, referred to as a common ancestor. The common ancestor may be accomplished by looping over frames t in temporal order, where for each node $v_t$ for which a match $(v_t)$ exists, the common ancestor node is assigned as, an ancestor $(v_t)$=ancestor (match $(v_t)$), using the following algorithm 1.

Algorithm 1: Identifying common ancestor nodes for merging
for $v_1 \in V_t^s$ do
ancestor $(v_1):=v_1$
for t=2 to n do
for $v_1 \in V_t^s$ do
if match $(v_1)$ exists then
ancestor $(v_t):=$ancestor (match$(v_t)$)

Finally, for each ancestor, all graph nodes that share the same ancestor are merged into a single graph node. The feature $f_v^o$ associated with a new graph node (v) is obtained by averaging the features from all of the graph nodes that merged together. After each equivalence class of matched graph nodes are merged into the single graph node, an updated static sub-graph 218A ($G_{s'}$) is obtained. The updated static sub-graph ($G_{s'}$) is a reduced version of the static sub-graph 218A ($G_s$) as redundant static graph nodes are pruned. The pruning of the redundant static graph nodes may improve processing and computation speed scene-aware video encoder 202.

Further, graph nodes of the dynamic sub-graph 218B (referred to hereinafter as dynamic graph nodes) are incorporated with motion features (e.g., the motion features 214C). In some example embodiments, the motion features may be incorporated using a neural network, such as I3D action recognition neural network. The I3D action recognition neural network may be pre-trained on dataset, such as Kinetics-400 dataset to generate convolutional features from the video frames 208. The convolutional features may be pooled using a pooling technique (e.g., Region-of-Interest (ROI)). In particular, the convolutional features are ROI-pooled using the original bounding boxes associated with the dynamic graph nodes of the dynamic sub-graph 218B. For instance, the convolutional features may be represented as, $$f_{v_t}^\alpha = \text{ROIPool}(I3D(s_t), \text{bbox}_{v_t}) \quad (3)$$

where $s_t$ denotes the video frames 208 around the t-th video frame of the video 104 (S), then a feature vector outputted by the FRCNN object detection model are augmented by concatenating the object and motion features as $f_v^{o\alpha} \leftarrow f_v^o \| f_v^\alpha$, for all $v \in V_d$, where $\|$ is an operator for feature concatenation.

Further, in some embodiments, the spatio-temporal transformer 206 encodes different combinations of different nodes of the spatio-temporal scene graph 214 corresponding to different spatio-temporal volumes of the scene 102 into a latent space. The encoding of each node of the different nodes in each of the combinations is weighted with an attention score determined as a function of similarities of spatio-temporal locations of the different nodes in the combination, details of which are described later with reference to FIG. 6B. The different spatio-temporal volumes of the different nodes in the different combinations are shown and described next with reference to FIG. 3.

Figure 3:
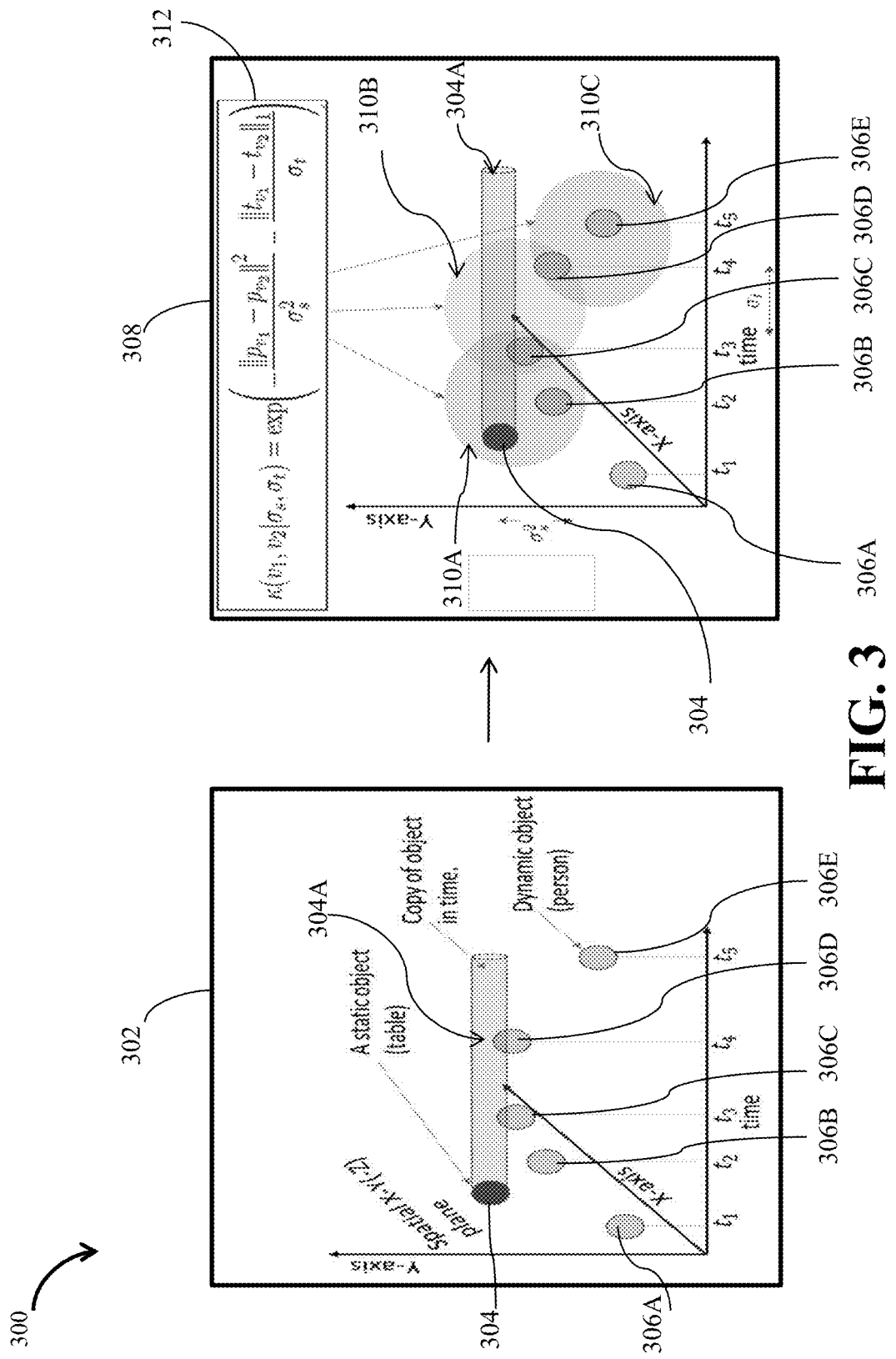
FIG. 3 shows of a graphical representation of different nodes of the spatio-temporal scene graph and a graphical representation of different combinations of different spatio-temporal volumes of different nodes of the spatio-temporal scene graph, according to some embodiments of the present disclosure.

FIG. 3 shows a graphical representation 302 of different nodes of the spatio-temporal scene graph 214 and a graphical representation 308 of different combinations of different spatio-temporal volumes of different nodes of the spatio-temporal scene graph 214, according to some embodiments of the present disclosure.

In an illustrative example scenario, the graphical representation 302 includes representation of a static node 304 of the spatio-temporal scene graph 214 at different time instances, such as $t_1$, $t_2$, $t_3$, $t_4$ and $t_5$ ($t_1$–$t_5$). The static node 304 may correspond to a static object, such as a table that remains static in different time instances in the video frames 208. At the different time instances (i.e., $t_1$–$t_5$), appearance and location of the object remains unchanged for the static object. The graphical representation 302 also includes representation of dynamic nodes corresponding to a dynamic object, such as a person in the video frames 208, at the different time instances ($t_1$–$t_5$). The dynamic nodes include a dynamic node 306A at $t_1$, a dynamic node 306B at $t_2$, a dynamic node 306C at $t_3$, a dynamic node 306D at $t_4$ and a dynamic node 306E at $t_5$.

Further, different combinations of different nodes of the spatio-temporal scene graph 214 are selected using a window sliding of different spatio-temporal volumes with different spatio-temporal resolutions, as shown in a graphical representation 308. The different combinations may include a combination 310A, a combination 310B and a combination 310C (referred to hereinafter as combinations 310A-310C), as shown in the graphical representation 308. The combination 310A includes combination of the static node 304, the dynamic node 306B and the dynamic node 306C at time instances, $t_2$ and $t_3$. The combination 310B includes combination of static object that can be visualized as the redundant copy 304A, the dynamic node 306C and the dynamic node 306D at time instances, $t_3$ and $t_4$. The combination 310C includes combination of the dynamic node 306D and the dynamic node 306E at time instances, $t_4$ and $t_5$. The combination 310B includes combination of the redundant copy 304A of the static node 304, the dynamic node 306B and the dynamic node 306C at time instances, $t_2$ and $t_3$.

Each of the combinations of different nodes (i.e., the combinations 310A-310C), captures combined features that include information of corresponding scene as defined by different radius (r). The combined features may also include correlations at multiple scales, i.e., for different values of the radius. For instance, features for nodes may include (person+cup), (cup+watch), (person+sofa), as well as correlations at multiple scales, (person+cup+book), (cup+book+watch), (person+sofa+person), or the like. In some example embodiments, the combined features that capture similarity of the different combinations, such as combinations 310A-310C may be extracted by the spatio-temporal transformer 212 using a similarity kernel (k) 312. In some example embodiments, the similarity kernel (k) 312 may correspond to one of a spatio-temporal kernel, a string kernel, a graph kernel, or any other similarity measure.

The similarity kernel 312 merges features from the graph nodes in the spatio-temporal scene graph 214 that are spatio-temporally nearby. For instance, for graph nodes $v_1$, $v_2 \in V'$ corresponding to objects, such as a person interacting with static objects in $G_s$, or dynamic objects in $G_d$, the similarity kernel (k) 312 for the two graph nodes ($v_1$, $v_2 \in V'$), is defined as, $$\kappa(v_1, v_2 \mid \sigma_s, \sigma_t) = \exp\left(-\frac{\|p_{v_1} - p_{v_2}\|^2}{\sigma_s^2} - \frac{\|t_{v_1} - t_{v_2}\|^2}{\sigma_t}\right) \quad (4)$$

The similarity kernel (k) 312 captures the spatio-temporal proximity between the two graph nodes $v_1$ and $v_2$ for different bandwidths denoted by $\sigma_s$ and $\sigma_t$ for spatial and temporal information of the video frames 208. In particular, the similarity kernel 312 creates the sliding window, i.e., the spatio-temporal sliding window (with widths defined by the bandwidths $\sigma_s$ and $\sigma_t$). The spatio-temporal sliding window captures the spatio-temporal proximity between static-dynamic graph nodes (i.e., the static node 304A, the dynamic nodes 306B and 306C), and dynamic-dynamic graph nodes (e.g., the dynamic nodes 306B and 306C) in the video frames 208. When dynamic objects move closer to the static objects in space-time, the similarity kernel 312 computes a non-zero score. The computed non-zero score may be used as an attention weight to merge semantic features of the respective graph nodes. For example, for the static graph node 304A, the similarity kernel 312 within the combination 310 may output the weights as $s_1$, $s_2$, $s_3$. The spatio-temporal transformer 212 creates a single feature for the combination 310A, whose feature is given by, $s_1$ f(static graph node 304A)+$s_2$ f(dynamic graph node 306B)+$s_3$ f(dynamic graph node 306C), where f is value embedding ($V_F$) of the spatio-temporal transformer 212 for each of the graph nodes. In this manner, the spatio-temporal transformer 212 outputs the combined features that aggregate spatio-temporal neighborhood information.

Further, the spatio-temporal features are improved to a representation towards a hierarchical abstraction of the spatio-temporal scene graph 214 at multiple granularities (or resolutions), which is described next with reference to FIG. 4.

Figure 4:
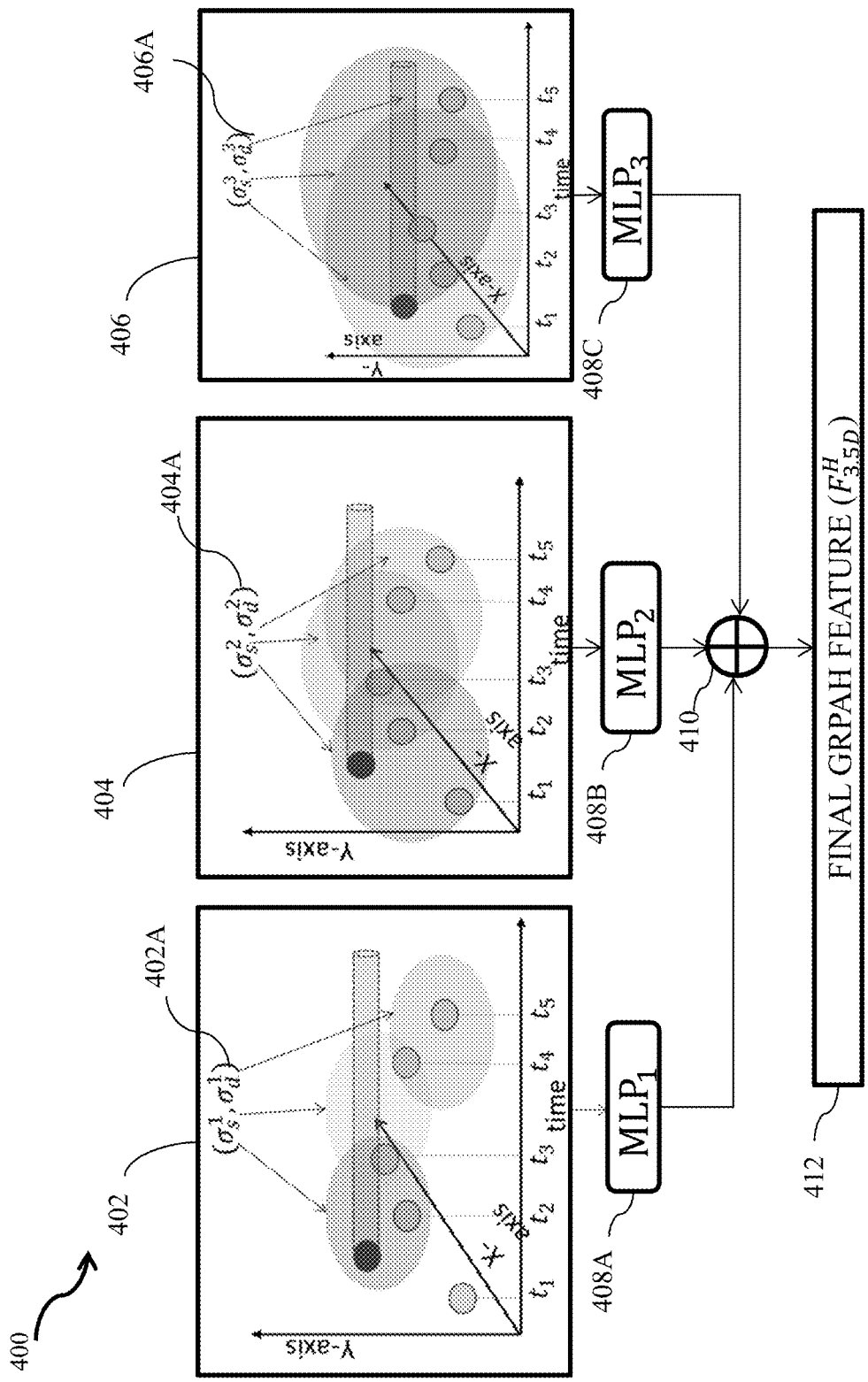
FIG. 4 shows a representation of a series of multilayer perceptrons, according to some embodiments of the present disclosure.

FIG. 4 shows a representation 400 of a series of multilayer perceptrons, such as $MLP_1$ 408A, $MLP_2$ 408B and an $MLP_3$ 408C, according to some embodiments of the present disclosure. In some embodiments, multiple spatio-temporal windows, such as set of η window sizes (defined by different bandwidths) may be used to capture spatio-temporal features of the video frames 208 at varied resolutions. The different bandwidths may include bandwidth 402A ($\sigma_s^1$, $\sigma_d^1$), bandwidths 402B ($\sigma_s^2$, $\sigma_d^2$) and bandwidths 402B ($\sigma_s^3$, $\sigma_d^3$).

As shown in FIG. 4, the representation 400 includes a graphical representation 402, a graphical representation 404 and a graphical representation 406. In the graphical representation 402, a spatio-temporal window defined by the bandwidths 402A ($\sigma_s^1$, $\sigma_d^1$) is used to compute a similarity kernel (e.g., the similarity kernel 312). Likewise, in the graphical representation 404, a spatio-temporal window defined by the bandwidths 402B ($\sigma_s^2$, $\sigma_d^2$) is used to compute the similarity kernel. In the graphical representation 404, a spatio-temporal window defined by bandwidths 402B ($\sigma_s^3$, $\sigma_d^3$) is used to compute the similarity kernel.

These similarity kernels outputted by the different spatio-temporal windows is computed on a union of the graph nodes in the updated static sub-graph 218A ($G_{s'}$) and the dynamic sub-graph 218B ($G_d$) to extract hierarchical information of the graph nodes, i.e., the interactions between the static and dynamic sub-graphs ($G_{s'}$ and $G_d$). To that end, the similarity kernel corresponding to the spatio-temporal window of bandwidths 402A is inputted to an MLP 408A ($MLP_1$), the similarity kernel corresponding to the spatio-temporal window of bandwidths 404A is inputted to an MLP 408B ($MLP_2$) and the similarity kernel corresponding to the spatio-temporal window of bandwidths 406A is inputted to an MLP 408C ($MLP_3$).

Let $\sigma_s^j$, $\sigma_t^j$, j=1, ..., η be a set of bandwidths (e.g., the bandwidths 402A, 404A and 406C) and $MLP_{i,j}$=1, ..., η be a series of multilayer perceptrons (e.g., the MLPs 408A, 408B and 408C). Each of the MLPs 408A, 408B and 408C outputs spatio-temporal features at different resolutions of the video frames 208. Suppose F denotes a matrix of features computed from the static sub-graph 218A and the dynamic sub-graph 218B via projecting original features of the spatio-temporal graph 214 into latent spaces of dimensionality r using the series of MLPs, such as the MLP 408A, 408B and 408C; i.e., $F = MLP_s f_{V_{s'}}{}^o \| MLP_d f_{V_d}{}^{o\alpha}$.

These spatio-temporal features are combined using a union operation 410. The union operation 410 combines the outputs of the MLPs 408aA, 408B and 408C into a hierarchical representation as final graph features 412 of the spatio-temporal scene graph 214. The final graph features 412 is given by, $$F_{3.5D}^H = \sum_{j=1}^{\eta} MLP_j \overset{k}{\underset{i=1}{\|}} \left( \text{softmax } K(V', V' | \sigma_s^j, \sigma_d^j) V_F^i \right) \quad (5)$$

The final graph features 412 that include the hierarchical information of the video frames 208 provide a provide a better scene representation of the video frames 208 than representation of features learnt from statistical proximities of objects in the training dataset.

Further, the final graph features 412 of the spatio-temporal scene graph 214 may be used in a video question-answering (VQA) task, which is explained next with reference to FIG. 5.

Figure 5:
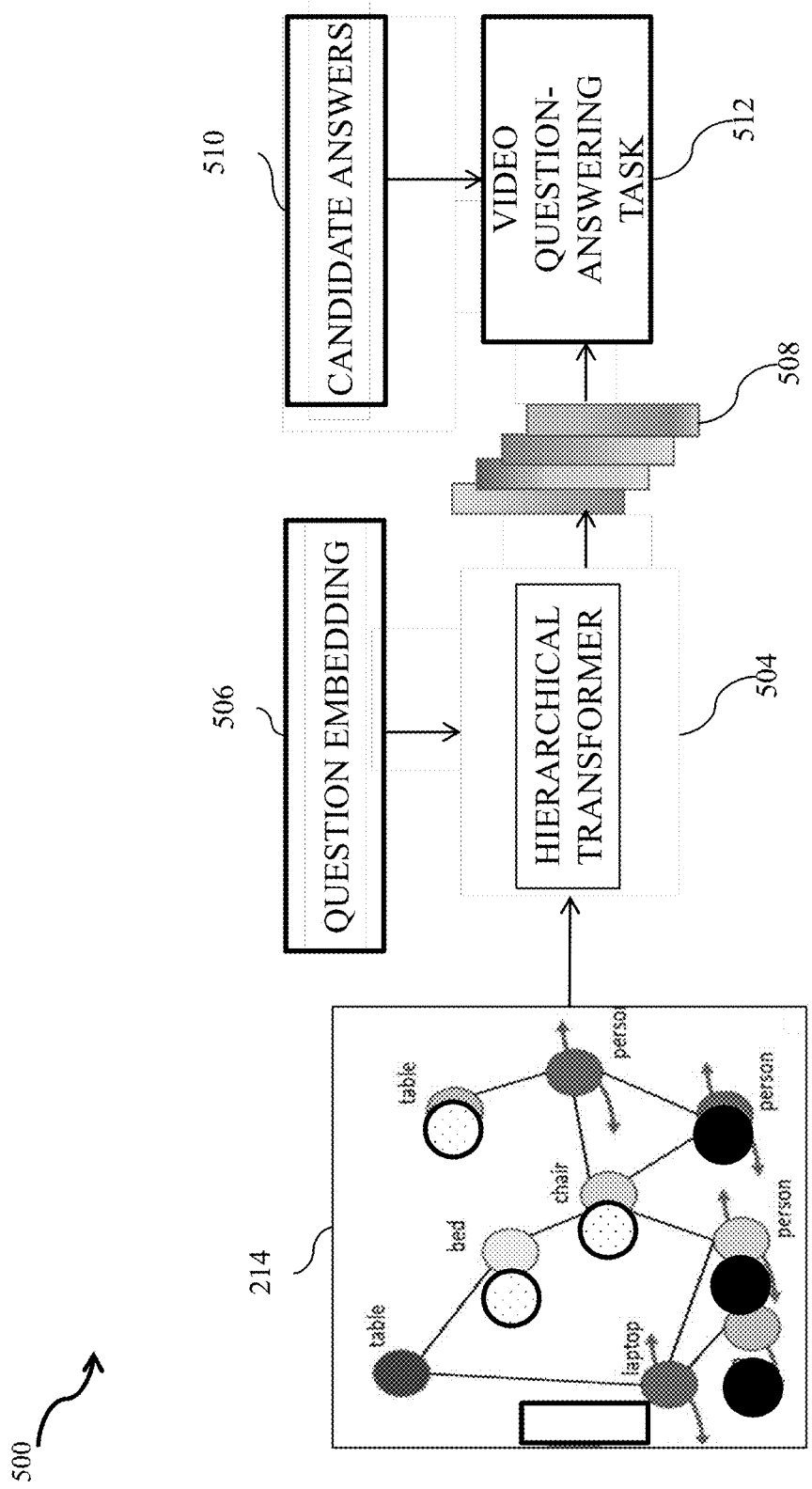
FIG. 5 shows a representation for decoding a transcription of the video of the scene, such as a video question answering (VQA) task using the spatio-temporal graph, according to some embodiments of the present disclosure.

FIG. 5 shows a representation 500 for decoding a transcription of the video of the scene, such as a VQA task 512 using the spatio-temporal scene graph 214 of a sequence of video frames (e.g., the video frames 208) of a video (e.g., the video 104), according to some embodiments of the present disclosure. The spatio-temporal scene graph 214 is inputted to a hierarchical transformer 504 along with a question embedding 506 of a query (e.g., "how did the cup fall?") corresponding to the video 104. For instance, a sequence of video frames, such as the video frames 202 (denoted as S) may include 'n' video frames. Each of the sequence of video frames (S) 208 may be associated with at least one question or query (Q). The query may be an ordered tuple of words from a predefined vocabulary that are tokenized and embedded.

As described earlier in FIG. 4, the final graph features 412 of the spatio-temporal scene graph 214 is combined with the question embedding 506 by the hierarchical transformer 504. The combined final graph features and the question embedding 506 are used as input features 508 for the VQA task 512.

In some embodiments, the VQA task 512 may be defined as that of retrieving a predicted answer, $A_{pred}$, from a collection or a set of 'l' candidate answers 510 (A={$A_1$, $A_2$, ..., $A_l$}). The 'l' candidate answers 510 may include a ground-truth answer ($A_{gt}$).

For the video QA task, a standard transformer may be used to produce multi-headed self-attention on the question embedding 506, which is described next in FIG. 6A. This step precedes attending the encoded questions on the final graph features 412 ($F_{3.5D}^H$) via a multi-headed cross-attention transformer, followed by an average pooling to produce question-conditioned features ($F_{3.5D}^Q$).

Figure 6A:
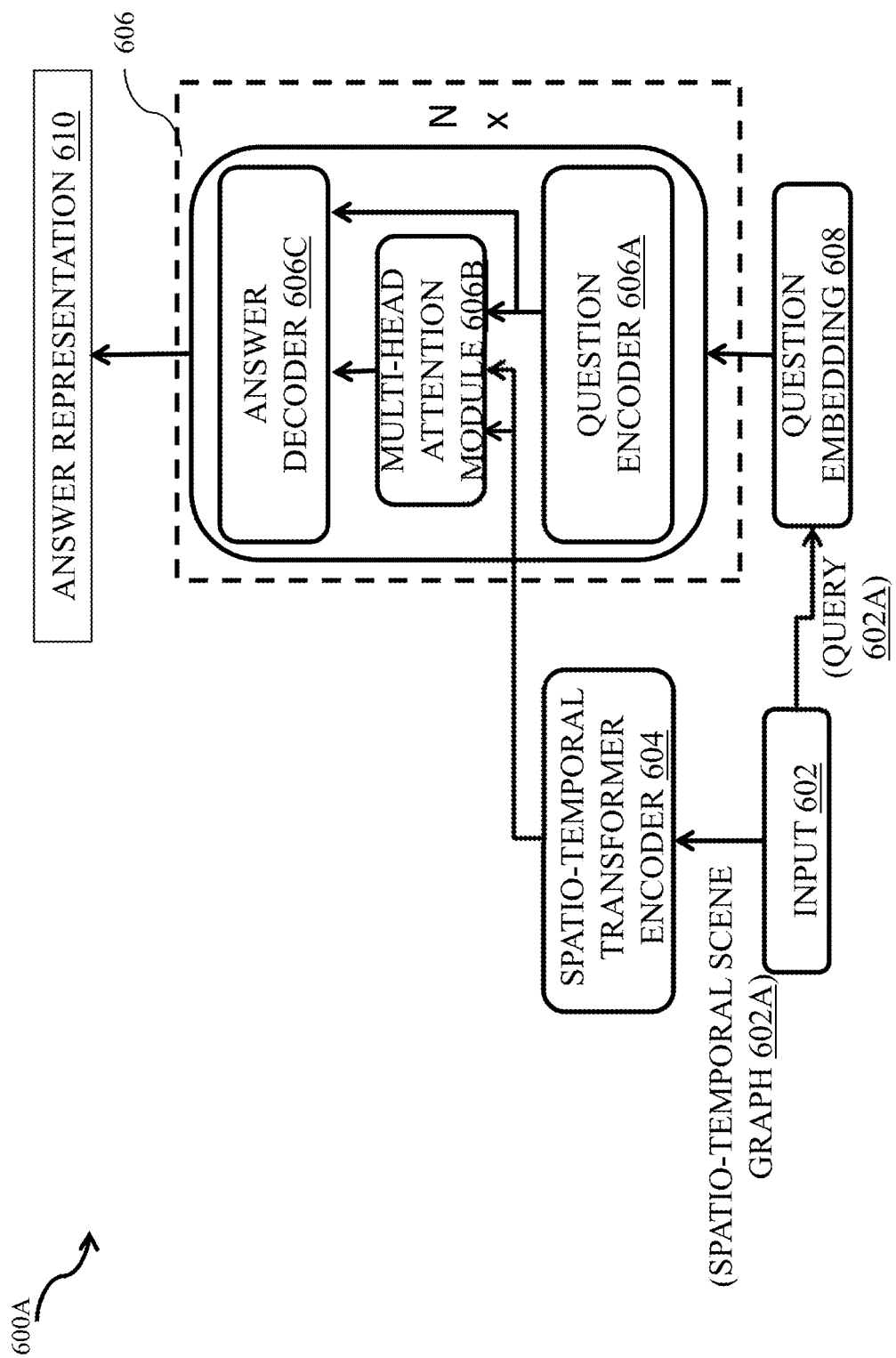
FIG. 6A shows an architecture representation of a spatio-temporal transformer with a standard transformer for the VQA task, according to some embodiments of the present disclosure.

FIG. 6A shows an architecture representation 600A of a spatio-temporal transformer 604 with a standard transformer 606, according to some embodiments of the present disclosure. The standard transformer 606 includes a question encoder 606A, a multi-head attention module 606B and an answer decoder 606C.

In some example embodiment, an input 602 that includes a spatio-temporal scene graph 602A. The spatio-temporal scene graph 602A is an example of the spatio-temporal scene graph 214 that is inputted to spatio-temporal transformer 604. The input 602 may also include a query (Q) 602B corresponding to the video frames 208 that is inputted to the standard transformer 606. In some example embodiments, the query 602B is inputted as question embedding 608 to the standard transformer 606. The standard transformer 606 uses the question encoder 606A to create query, key, and value embeddings for answering the query. The query, key, and value embeddings are created using graph node features of the spatio-temporal scene graph 214 (e.g., the final graph feature 412). The standard transformer 606 uses the graph node features to produce correlations between the query and key. The correlations determine an interaction, i.e., an edge between two graphs nodes of the spatio-temporal scene graph 214. For example, in the training data, there may be samples of a person interacting with a cup, then for a scene with a person holding a cup, there is high correlation between features of the person and the cup. To that end, the standard transformer 604 may assign a self-attention to add an edge connecting graph nodes of the person and cup based on the high correlation between the features of person and cup.

If $Q_F^i, K_F^i, V_F^i \in \mathbb{R}^{r_k \times |V|}$ denotes the $i^{-th}$ k-headed query (Q), key (K), and value (V) embeddings of F respectively, and $r_k = r/k$, then the equation 6, outputs features F' given by:

$$F' := \overset{k}{\underset{i=1}{\|}} \text{softmax}\left(\frac{Q_F^i K_F^{i\,T}}{\sqrt{r_k}}\right) V_F^i \tag{6}$$

The softmax function in equation (6) normalizes the Q, K and V embeddings into a probability distribution that consist of k probabilities over an output (e.g., a word). In an example embodiment, the softmax function transforms scores into probabilities from which the highest probability is chosen as a word output of the standard transformer 606.

Further, the final graph features 412 outputted by the spatio-temporal transformer 604 are used as question-conditioned features by the standard transformer 606 to predict an answer ($A_{pred}$) for the query. Furthermore, the standard transformer 606 computes similarities between the predicted answer and a set of candidate answers, such as the set of candidate answers 510. For instance, the query "What activity is the child doing?" may have the set of candidate answers 510 may include "presentation", "happy", "drawing", "touching" and "playing with a dog". In some embodiments, the predicted answer may be defined as, $$A_{pred} = \text{softmax}(F_{3.5D}{}^Q {}^T \lambda(A)) \tag{7}$$

where $\lambda(A)$ represents embeddings of the set of candidate answers 510.

In some embodiments, during training process of the standard transformer 606 for the VQA task 512, a cross-entropy loss between the predicted answer $A_{pred}$ and the ground truth answer $A_{gt}$ may be computed. In particular, the cross-entropy loss is computed against $b \times \ell$ answers produced via concatenating all the answers in a batch. The computation of the cross-entropy loss for $b \times \ell$ answers may output accurate gradients and may improve the training process. Further, the answers are concatenated as text answers that are decoded by the answer decoder 606C to output an answer representation 610 for the query.

In some example embodiments, a dialog history and/or caption features of the video frames 208 may be used for outputting the answer representation 610. To that end, the standard transformer 606 may encode the query and the answers using a long-short term memory (LSTM) into a feature space (e.g., 128D feature space). In particular, the LSTM may encode the dialog history and caption features that are combined with the final graph features 412 and output the answer representation 610. In some example embodiments, the answer representation 610 may be obtained by encoding the dialog history, the caption features and the final graph features 412 using the multi-head attention module 606B.

The architecture of the spatio-temporal transformer 604 and the standard transformer 606 may vary, which is described next with reference to FIG. 6B.

Figure 6B:
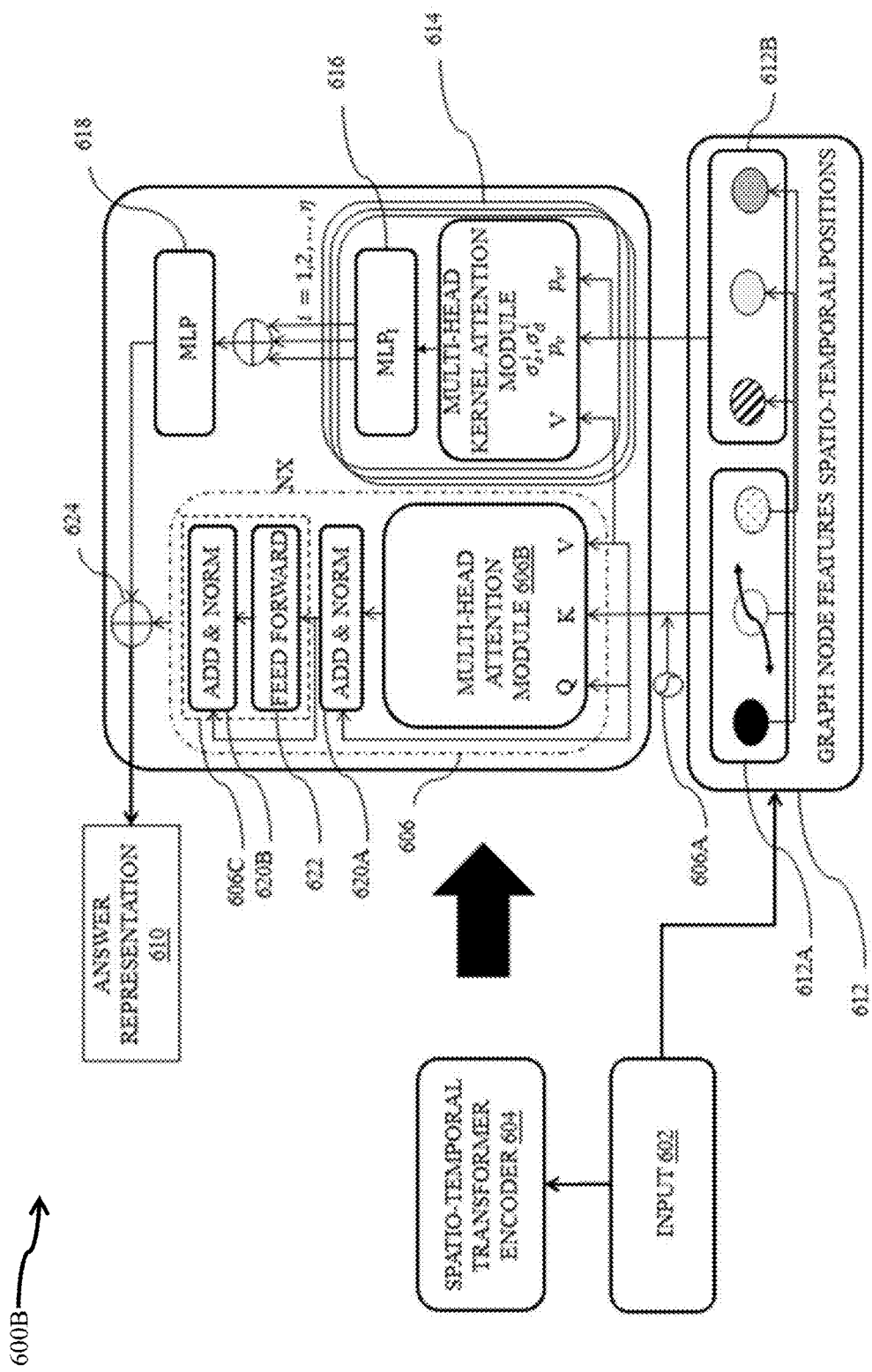
FIG. 6B shows another architecture representation of a spatio-temporal transformer with a standard transformer for the VQA task, according to some other embodiments of the present disclosure.

FIG. 6B shows an architecture representation 600B of the spatio-temporal transformer 604 and the standard transformer 606 for the VQA task 512, according to some other embodiments of the present disclosure. In some example embodiments, the standard transformer 606 may encode relative/absolute positions of the input 602 as input vectors 612. For instance, the input vectors 612 may include graph nodes features 612A, such as features of static graph nodes (e.g., the static graph nodes 214A), motion features (e.g., the motion features 214B) and features of dynamic graph nodes (e.g., the dynamic graph nodes 214C) as well as corresponding spatio-temporal positions 612B of the graph node features 612A. The relative positions of the query 602A may also be encoded as input vectors. The input vectors are added to an input embedding based on the relative positions.

Further, the multi-head attention module 606B is connected to a feed-forward layer 622 of the answer decoder 606C via an add and norm layer 602A. The feed-forward layer 622 concatenates outputs (e.g., matrices of features of the query 602B) of the multi-head attention module 606B into a single matrix by multiplying the matrices with an additional weight matrix.

The outputs of the feed-forward layer 622 are sent to the answer decoder 606C via an add and norm sublayer 620B. The output vectors with scores are provided to a softmax layer 624 of the answer decoder 606C. The softmax function 624 distributes a softmax or normalize over a word output. In an example embodiment, the softmax layer 624 transforms the scores into probabilities and the highest probability is chosen as the answer representation 610.

In some example embodiments, the feed-forward layer 622 combines the outputs in a position-wise manner upon aggregating information from other words in a multi-head kernel module 614. The multi-head kernel module 614 may compute similarity kernels to capture position information in the spatio-temporal positions 612B. In some example embodiments, the MLP module 616 may include a series of MLPs, such as the MLP 408A, 408B and 408C. After the concatenation, the combined similarity kernels is outputted as one feature representation (e.g., final graph features 412) of the spatial-temporal scene graph 602A via another MLP module 618. For example, the kernels multiple the values, and the resulting values are embedded using MLPs, and then concatenated. Concatenation happens in the+symbol at the output of 616 in FIG. 6B.

In some example embodiments, the multi-head kernel module 614 also perform a dot-product attention mechanism. In the dot-product attention mechanism, a dot product of a query Q (e.g., the query 602B) with a key K of a respective word in the query 602B may be calculated. For instance, the query 602B may be "What is happening at beginning of the video?". Each word of the query 602B, i.e. "What", "is", "happening", "at", "beginning", "of", "the" and "video", is embedded into vectors by the multi-head kernel attention module 614. The vectors may be multiplied by matrices to create the query 602B with a key and a value for each of the words in the query 602B. An attention score may be calculated by taking the dot product of the query 602B and the key of the respective words. For example, an attention score of first word, i.e. "What" is calculated. An attention score for each of the remaining words, i.e., "is", "happening", "at", "beginning", "of", "the" and "video" is also calculated against the word "What".

Each of the attention scores determines importance to be placed on other parts of the query 602B as a word is encoded at a certain position. The first attention score for the word in first position (i.e., "What") is a dot product of first query ($q_1$) and first key ($k_1$), i.e. "What" vs "What". The second attention score is dot product of $q_1$ and second key ($k_2$), i.e. "What" vs "is". In a similar manner, third attention score for word (i.e., "happening") is dot product of $q_1$ and third key ($k_3$), i.e. "What" vs "happening" and fourth attention score for word (i.e., "at") is dot product of $q_1$ and fourth key ($k_4$), i.e. "What" vs "at" and continues till end of the word of the query 602B. Such attention scores are divided by a square-root of feature dimension $r_k$ of equation (6). Further, each value of the keys is multiplied by the attention score. The attention score is multiplied to each of the values as weight. The weighted values are summed up to provide an output, i.e., the answer representation 610 words at corresponding position in the answer for the query 602B. In order to output the words of the answer representation 610 in proper positions, positional encoding encodes relative/absolute positions of outputs as vectors that are added to output the answer representation 610 of the answer decoder 606C. This allows output of the multi-head attention module 606B to be in same order of sequence of inputs of the input 602. Each dimension of the positional encoding of the input vectors 612 may be a wave with a different frequency that may allow the standard transformer 606 to learn to attend relative positions of input features (of the spatio-temporal scene graph 602A and/or the query 602B) in the input 602.

In the architecture representation 600B, the multi-head kernel module 614 and the multi-head attention module 606B are separate and their corresponding outputs (i.e., the final graph features 412 of the spatio-temporal scene graph 214 and the features of the query 602B) are combined at the softmax layer 624 to output the answer representation 610 for the query 602B of the video frames 208.

In some cases, the final graph features 412 of the spatio-temporal scene graph 214 and the features of the query 602B are merged before inputting to the standard transformer 606, which is explained next in FIG. 6C.

Figure 6C:
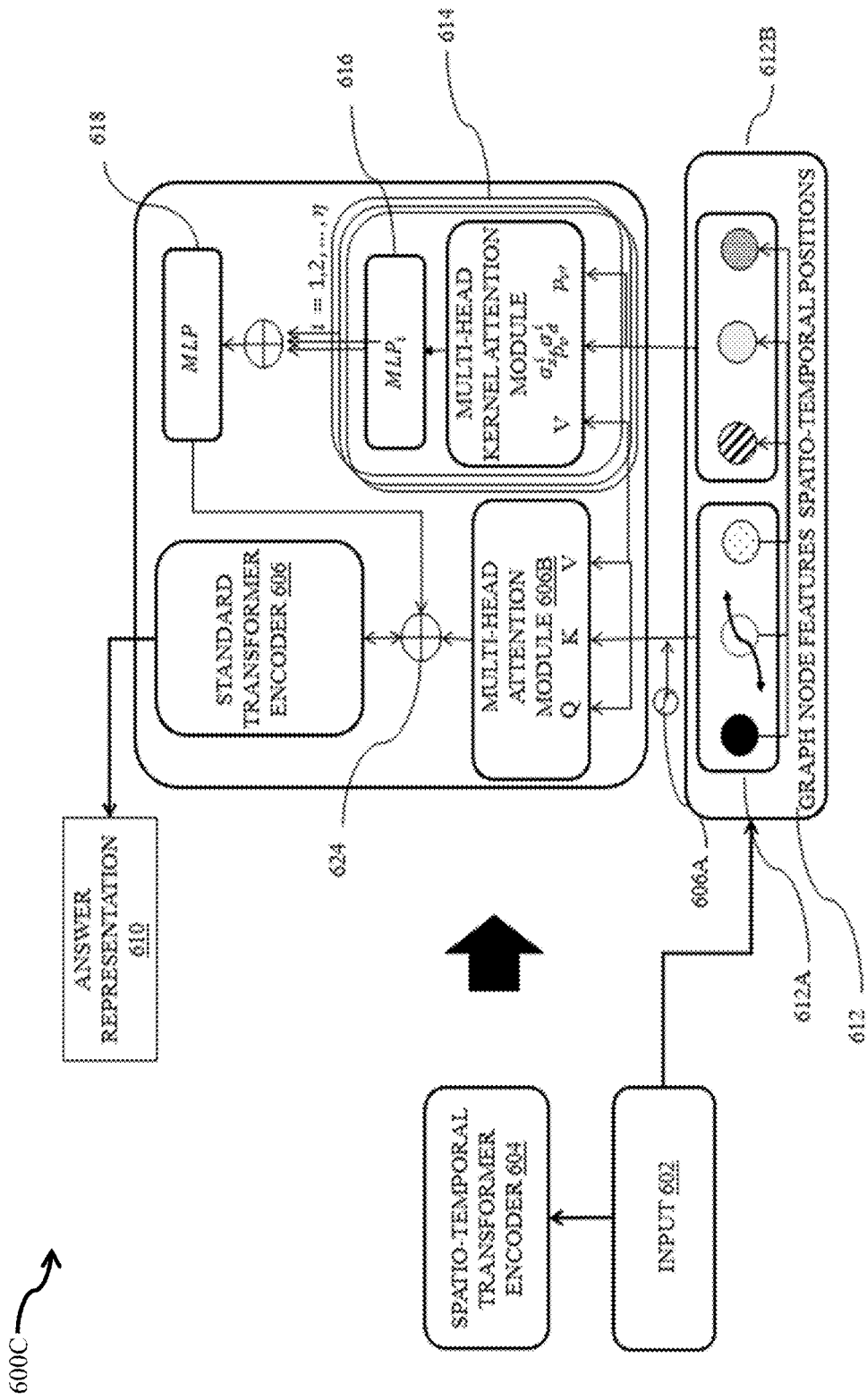
FIG. 6C shows yet another architecture representation of a spatio-temporal transformer with a standard transformer for the VQA task, according to yet some other embodiments of the present disclosure.

FIG. 6C shows an architecture representation 600C of the spatio-temporal transformer 604 and the standard transformer 606 for the VQA task 512, according to some other embodiments of the present disclosure. As mentioned earlier in FIG. 6B, the input 602 is inputted as input vectors 612 that includes the graph node features 612A and the spatio-temporal positions 612B. The graph node features 612A are used in encoding of the query 602B into query, key, and value embeddings for answering the query 602B by the question encoder 606A. The query, key, and value embeddings are inputted to the multi-head attention module 606B. The multi-head attention module 606B outputs scores for words corresponding to the query 602B into probabilities using the softmax layer 624. The softmax layer 624 may also incorporate the probabilities along with the similarity kernels outputted by the multi-head kernel attention module 614.

The output of the softmax layer 624 that combines the probabilities and the similarity kernels are inputted to the standard transformer 606. The standard transformer 606 may select the highest probability from the probabilities to output the answer representation 610. As shown in FIG. 6C, in the architecture representation 600C, outputs of the multi-head attention module 606B, i.e., the query, key and values embeddings and outputs of the multi-head kernel attention module 614, i.e., the similarity kernels are merged at the softmax layer 624 before inputting to the standard transformer 606.

The use of the spatio-temporal scene graph 214 of the spatio-temporal video encoder system 202 may improve performance of the VQA task 512. The evaluation on the performance of the VQA task 512 using the spatio-temporal scene graph 214 is shown in FIG. 7A.

FIG. 7A shows an evaluation study 700A for a VQA task (e.g., the VQA task 512) using the scene-aware video encoder system 202, according to some embodiments of the present disclosure. In some example embodiments, performance of the scene-aware video encoder system 202 for the VQA task may be evaluated using VQA datasets, such as NExT-QA and AVSD-QA datasets. The NExT-QA dataset incorporates questions that include "why" and "how" words. Such datasets with the "why" and "how" questions demand higher level abstractions and semantic reasoning of the videos. The dataset consists of 3,870 training, 570 validation, and 1,000 test videos. The dataset provides 34,132, 4,996, and 8,564 multiple choice questions in the training, validation, and test sets respectively, and the task is to select one of the five candidate answers. The AVSD-QA dataset consists QA pairs, human generated conversation history, and captions for each video. In the QA version of this dataset, the task is to use the last question from dialog history about the video to select an answer from one of a hundred candidate answers. The dataset consists of 11,816 video clips, and 118,160 QA pairs of which we follow the standard splits to use 7,985, 1,863, and 1,968 for training, validation, and test.

The evaluation study 700A depicts a table 702 and a table 704 that show comparison of performance of the spatio-temporal transformer 212 pipeline against state-of-the-art methods. In the table 702, accuracy of the spatio-temporal transformer 212 is compared with methods, such as spatio-temporal VQA, co-memory-QA, a Hierarchical relation network, a multi-modal attention VQA and a graph-alignment VQA. The spatio-temporal transformer 212 shows performance for the VQA task with an accuracy of 53.40. In the table 704, mean rank of the spatio-temporal transformer 212 is compared with methods, such as question-only, multimodal transformer, question and video, MTN and ST scene graphs. The scene-aware video encoder system 202 resulted with a mean rank of 5.84.

On the NExT-QA dataset, methods that use the spatio-temporal transformer 212 for VQA such as graph alignment and hierarchical relation models are compared against spatio-temporal scene graph model, which shows a significant ~4% improvement. On the training dataset AVSD-QA, as provided in the table 704, the spatio-temporal transformer 212 is compared against STSGR model as well as multi-modal transformers, that are outperformed in the mean rank of the retrieved answer. When AVSD-QA model is combined with text-cues, such as the dialog history and caption features, the mean rank improves to nearly 1.4, suggesting a significant bias between the questions and the text-cues.

For the NExT-QA dataset, Bidirectional Encoder Representations from Transformer (BERT) features may be used for every question embedding. The BERT features include 768D features, which are projected into 256D latent space to be combined with visual features of the spatio-temporal scene graph 214. Each candidate answer is concatenated with a question, and the BERT features are computed before matching with the visual features for selecting the answer. For the NExT-QA dataset, the BERT features are augmented with CLIP features that may have better vision-language alignment. For the AVSD-QA dataset, the spatio-temporal transformer 202 may encode the question and the answers using an long-short term memory (LSTM) into a 128D feature space. The LSTM is used to encode the dialog history and the caption features that are then combined with the visual features using multi-headed attention module (e.g., the multi-head attention module 606B).

Further, qualitative results on the two datasets (i.e., the NExT-QA and AVSD-QA datasets) are shown in FIG. 7B FIG. 7B shows an ablation study 700B for the scene-aware video encoder system 202, according to some embodiments of the present disclosure. The ablation study 700B depicts a table 708, a table 710 and a table 712. The table 708 shows an ablation study on importance of each component for the scene-aware video encoder system 202, i.e., the spatio-temporal encoder 212 on both the NExT-QA and AVSD-QA datasets. The table 708 shows that without sub-graphs of the spatio-temporal scene graph 214, i.e., the static sub-graph 218A or the dynamic sub-graph 218B, the performance drops. Further, without motion features, such as the motion features 214C (e.g., I3D features), the performance drops significantly for both the datasets, underlining the importance of motion features 214C in pipeline of the scene-aware video encoder system 202. Further, without a hierarchical abstraction by the hierarchical transformer 504, the performance drops from 53.40→52.49 on the NExT-QA, and 5.84→5.97 on the AVSD-QA.

Further, the table 710 show ablations on the NExT QA dataset, when a full set of graph nodes of the spatio-temporal graph 214 are used for inference. The performance improves mildly, time taken for every training iteration case slows down 4-fold (from ~1.5 s per iteration to ~6 s on a single RTX6000 GPU).

Furthermore, the table 712 shows comparison of the number of nodes in the static sub-graph 218A and the dynamic sub-graph 218B. Each of the number of nodes in the static sub-graph 218A and the dynamic sub-graph 218B is compared with total number of graph nodes in original spatio-temporal scene graph 214 (i.e., unpruned scene graph) for both the datasets. As the results show, the scene-aware video encoder 202 prunes nearly 54% of graph nodes on AVSD-QA dataset and 24% on NExTQA. The higher pruning ratio for AVSD-QA is perhaps due to the fact that most videos do not contain shot-switches and may use a stationary camera, which is not the case with NExT-QA.

Figure 8:
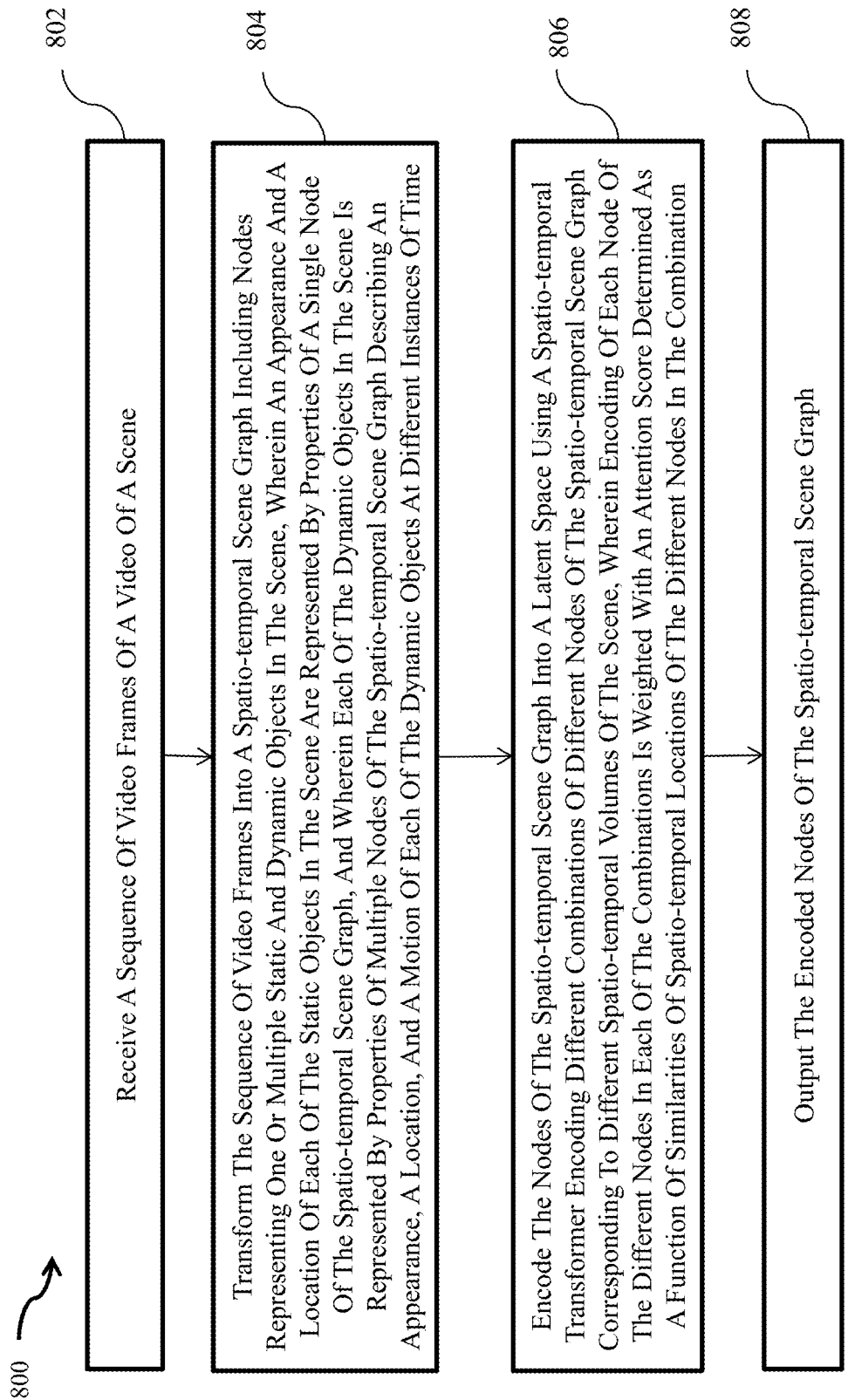
FIG. 8 shows a flow diagram of a method for encoding a video, according to some embodiments of the present disclosure.

FIG. 8 shows a flow diagram of a method 800 for encoding a video, according to some embodiments of the present disclosure. The method 800 is executed by the scene-aware video encoder system 202.

At operation 802, the method 800 includes receiving a sequence of video frames (e.g., the video frames 208) of a video (e.g., the video 104) of a scene (e.g., the scene 102).

At operation 802, the method 800 includes transforming the sequence of video frames into a spatio-temporal scene graph (e.g., the spatio-temporal scene graph 214) including nodes representing one or multiple static and dynamic objects in the scene. An appearance and a location of each of the static objects in the scene are represented by properties of a single node (e.g., static node 214A) of the spatio-temporal scene graph. Each of the dynamic objects in the scene is represented by properties of multiple nodes (e.g., the dynamic node 214B) of the spatio-temporal scene graph describing an appearance, a location, and a motion of each of the dynamic objects at different instances of time.

At operation 806, the method 800 includes encoding the nodes of the spatio-temporal scene graph into a latent space using a spatio-temporal transformer (e.g., the spatio-temporal transformer 212). The spatio-temporal transformer encodes different combinations of different nodes of the spatio-temporal scene graph corresponding to different spatio-temporal volumes of the scene (FIG. 3). Each node of the different nodes encoded in each of the combinations is weighted with an attention score determined as a function of similarities of spatio-temporal locations of the different nodes in the combination.

At operation 808, the method 800 includes outputting the encoded nodes of the spatio-temporal scene graph. In some embodiments, the latent space with the encoded nodes of the spatio-temporal scene graph may be used to decode a transcription of the video of the scene using a decoder trained with the spatio-temporal transformer.

Figure 9:
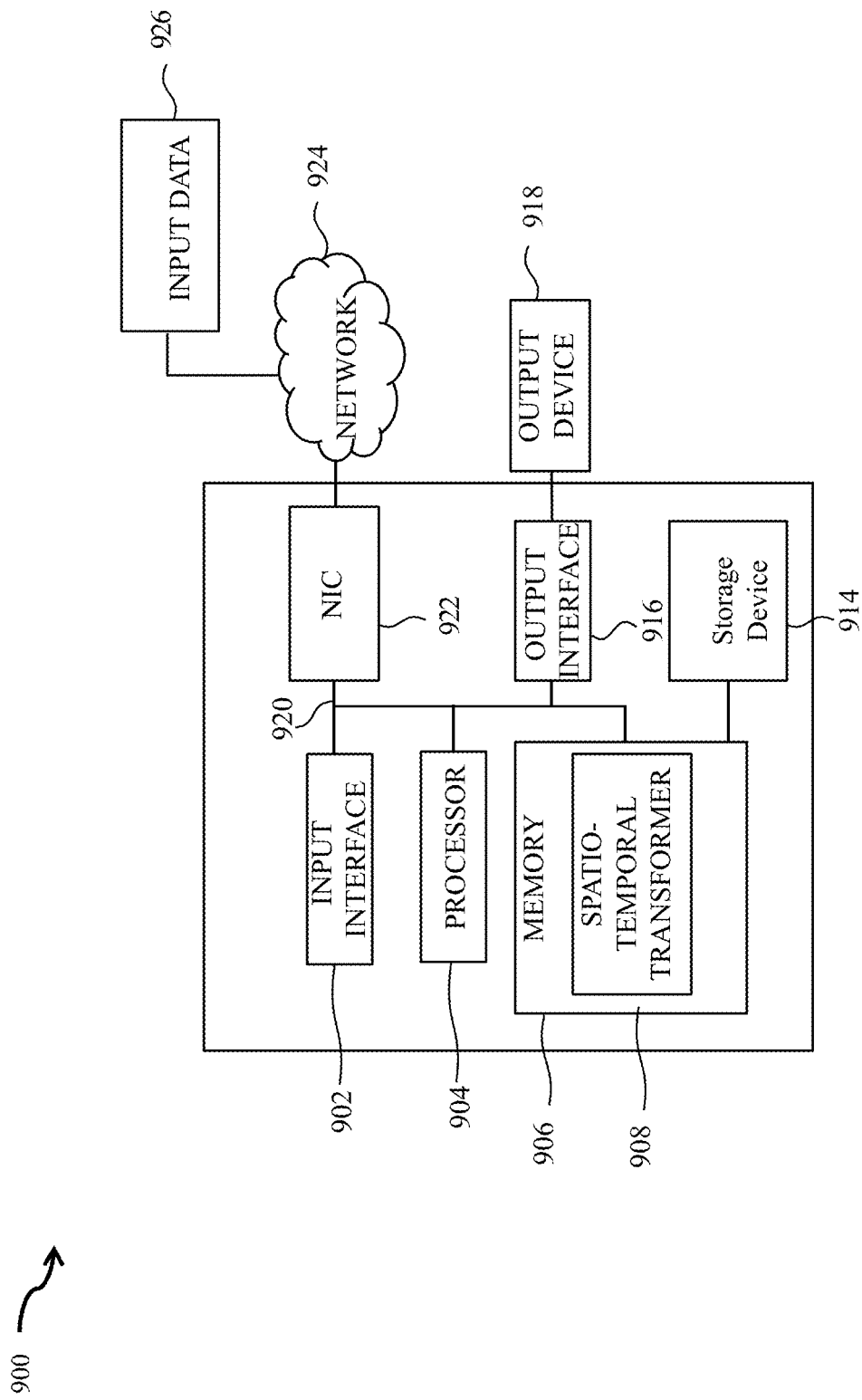
FIG. 9 shows a schematic block diagram of the scene-aware video encoder system, according to some embodiments of the present disclosure.

FIG. 9 shows a schematic block diagram of a scene-aware video encoder system 900, according to some embodiments of the present disclosure. The scene-aware video encoder system 900 corresponds to the scene-aware video encoder system 202. In an example embodiment, the scene-aware video encoder system 900 includes an input interface 902, a processor 904, a memory 906, a storage device 914, and an output interface 916. The processor 904 may be connected to the input interface 902, the memory 906, the storage device 914, the output interface 916 and/or other components of the scene-aware video encoder system 900, via a bus 920.

The processor 904 is configured to receive input data 926 via an input interface 902. The input data 926 may include a sequence of video frames of a video (e.g. the video frames 208 of the video 104), and/or a query (e.g., the query 602B) for the video. The video may correspond to a live-stream video, an offline video stream, or a pre-recorded video that may be received via network 924 using network interface controller (NIC) 922. The offline video stream may be stored in the storage device 914.

The processor 904 is configured to transform the sequence of video frames into a spatio-temporal scene graph (e.g., the spatio-temporal scene graph 214). The spatio-temporal scene graph includes nodes representing one or multiple static and dynamic objects in the scene. Each of the static objects in the scene has an appearance and a location that are represented by properties of a single node of the spatio-temporal scene graph, and each of the dynamic objects in the scene is represented by properties of multiple nodes of the spatio-temporal scene graph. The properties of multiple nodes describe an appearance, a location, and a motion of each of the dynamic objects at different instances of time.

The processor 904 is also configured to encode the nodes of the spatio-temporal scene graph into a latent space using a spatio-temporal transformer 908. The spatio-temporal transformer 908 is an example of the spatio-temporal transformer 212. In some example embodiment, the encoded spatio-temporal transformer 908 in the latent space may be stored in the memory 906. Further, the spatio-temporal transformer 908 encodes different combinations of different nodes of the spatio-temporal scene graph corresponding to different spatio-temporal volumes of the scene. Each node of the different nodes in each of the combinations is encoded and weighted with an attention score determined as a function of similarities of spatio-temporal locations of the different nodes in the combination.

In some embodiments, the encoded nodes of the spatio-temporal scene graph 214 may be used for decoding a transcription of the video of the scene from the latent space using a decoder trained with the spatio-temporal transformer 908. To that end, the encoded nodes of the spatio-temporal scene graph 214 are outputted to an output device 918 via the output interface 916. The output device 918 includes, but not limited to, a computer, a laptop, a tablet, a phablet, or any display device. In some implementations, the output device 918 may include an application interface for rendering the response.

Exemplar Embodiments

Figure 10:
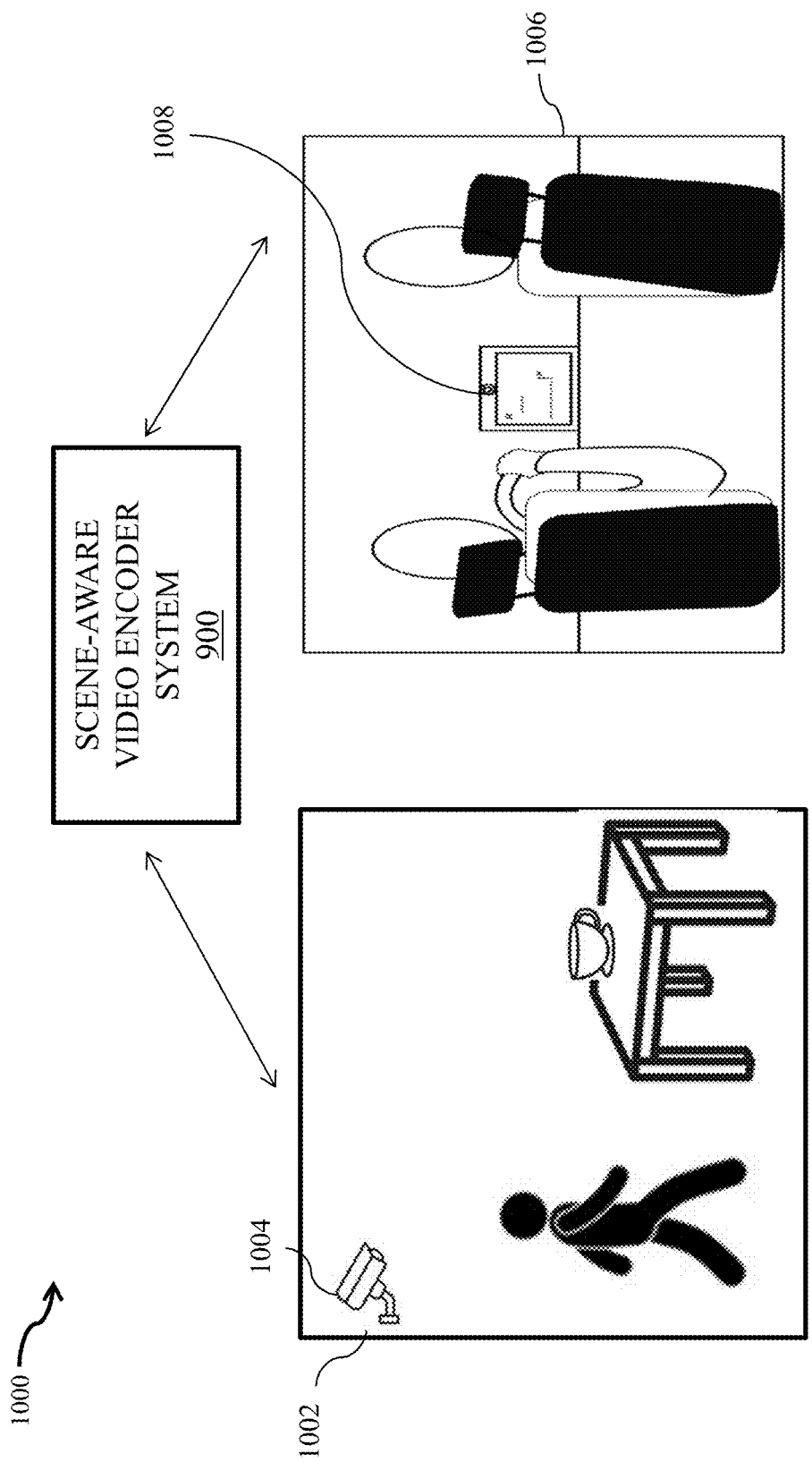
FIG. 10 shows a use case implementation for the scene-aware video encoder system, according to some embodiments of the present disclosure.

FIG. 10 illustrates an exemplar use case 1000 for the scene-aware video encoder system 900, according to some embodiments of the present disclosure. In an illustrative example scenario, a video of a scene 1002 may be captured by a camera 1004. In some cases, the camera 1004 may be installed at a predefined fixed location to capture the scene 1002. The scene 1002 may include different objects that are static and/or dynamic, such as a person moving around, a cup on a table, etc. The scene 1002 may correspond to an indoor location of a public or a private area, such as an office, a house, a store, or the like. In some cases, the scene 1002 may correspond to an outdoor location, such as a road, a park, or the like. The captured video of the scene 1002 may be transmitted to the scene-aware video encoder system 900 via a network, such as the network 924.

The scene-aware video encoder system 900 processes the video and outputs a spatial-temporal scene graph. The spatial-temporal scene graph is encoded into a latent space. The encoded spatial-temporal scene graph in the latent space is used for decoding a transcription of the video of the scene 1002. For instance, the video of the scene 1002 may be under surveillance for safety and security unit. When there is a suspicious or interested event observed in the scene 1002, the encoded spatial-temporal scene graph may be used for a video transcription.

In a similar manner, the scene-aware video encoder system 900 may be used in a vehicle navigation application. In an illustrative example scenario, a camera 1008 may be equipped in a vehicle (e.g., a manually operated vehicle, a fully automated vehicle or a semi-automated vehicle) to capture a road scene 1006. The camera 1008 may be in motion to capture a video the road scene 1006. The captured video of the road scene 1006 may be transmitted to the scene-aware video encoder system 900 via a network, such as the network 924. In some cases, the scene-aware video encoder system 900 may be embedded in the camera 1008. The scene-aware video encoder system 900 processes the video and outputs a spatial-temporal scene graph for the road scene 1006. The spatial-temporal scene graph is encoded into a latent space that may be used for decoding a transcription of the video of the road scene 1006. For instance, the transcription of the video may be used for generating navigation instructions. The navigation instructions may be displayed to operator(s) of the vehicle via a dashboard of the camera 1008.

Further, an example for transcription of the video of the scene 1002 or the scene 1006 for a VQA task is described next in FIG. 11.

Figure 11:
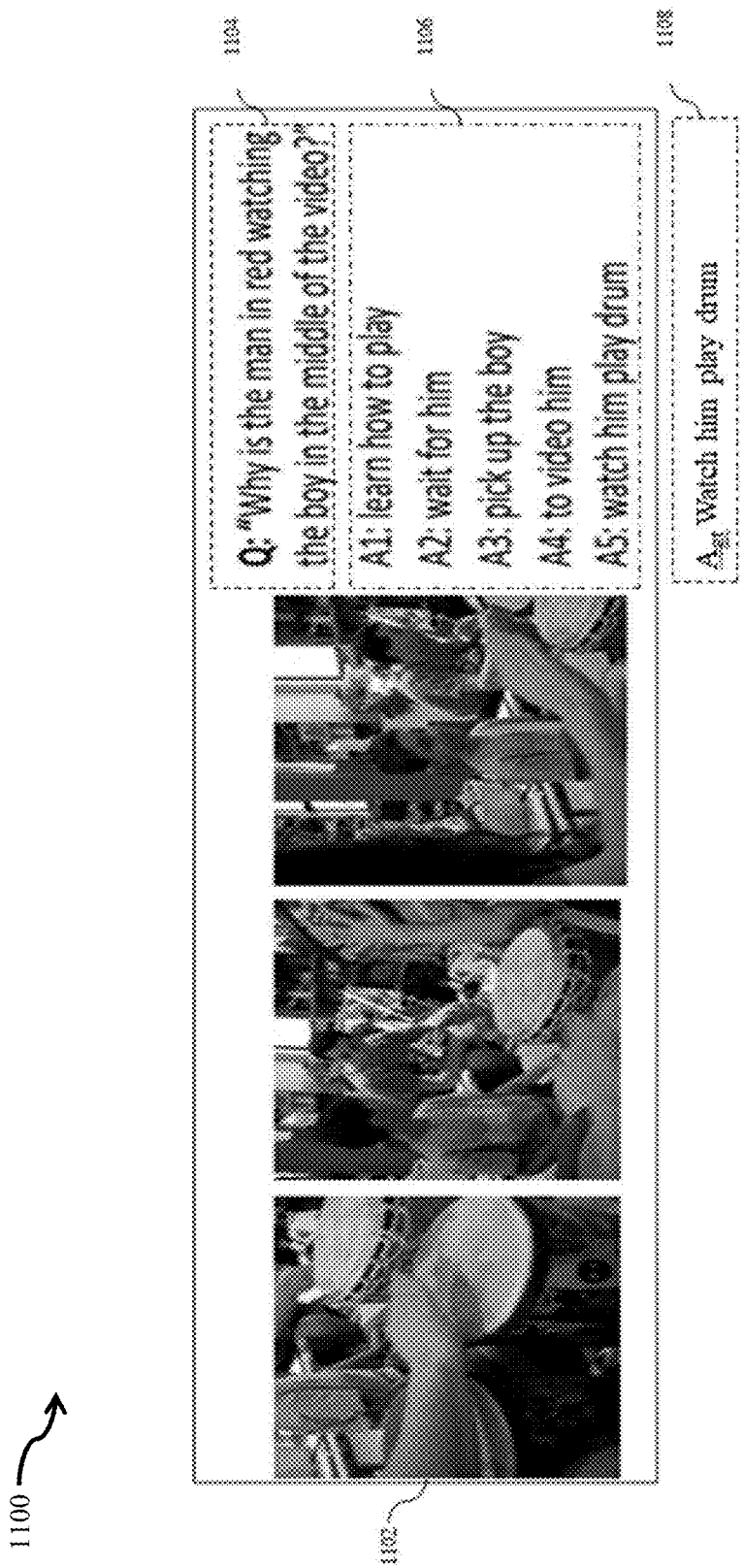
FIG. 11 shows a use case implementation for performing a VQA task using the scene-aware video encoder system, according to some embodiments of the present disclosure.

FIG. 11 is an example scenario for performing a VQA task 1100 using the scene-aware video encoder system 900, according to some embodiments of the present disclosure. In an illustrative scenario, a user provides a query 1102 via speech or text format. The query 1102 may include "Why is the man in red watching the boy in the middle of the video?". The scene-aware encoder system 900 retrieves a set of candidate answers 1104. The set of candidate answers 1104 includes "A1: learn how to play", "A2: wait for him", "A3: pick up the boy", "A4: to video him" and "A5: watch him play drum". The candidate answers 1106 includes a ground truth answer 1108, such as "$A_{gt}$: watch him play drum". Thus, the answer "A5: watch him play drum" that matches the ground truth answer 1108 is returned as output for the query 1104. The answer for the query 1104 may be retrieved based on a highest confidence score or highest probability approaches.

Some embodiments are based on realization that the spatio-temporal transformer FIG. 4 could be used for anomaly detection approaches. This is because the spatio-temporal transformer uses different principles of attention mechanism than other transformers. Specifically, while a transformer uses the same mechanisms for extracting keys, queries, and values, the spatio-temporal transformer of some embodiments use different extraction function for producing keys and queries and for producing the values. For example, the spatio-temporal transformer uses distance function for producing keys and querying and feature extraction function for producing values. In such a manner, the keys and queries can represent meta data of the values that add flexibility in application of the transformers.

Figure 12:
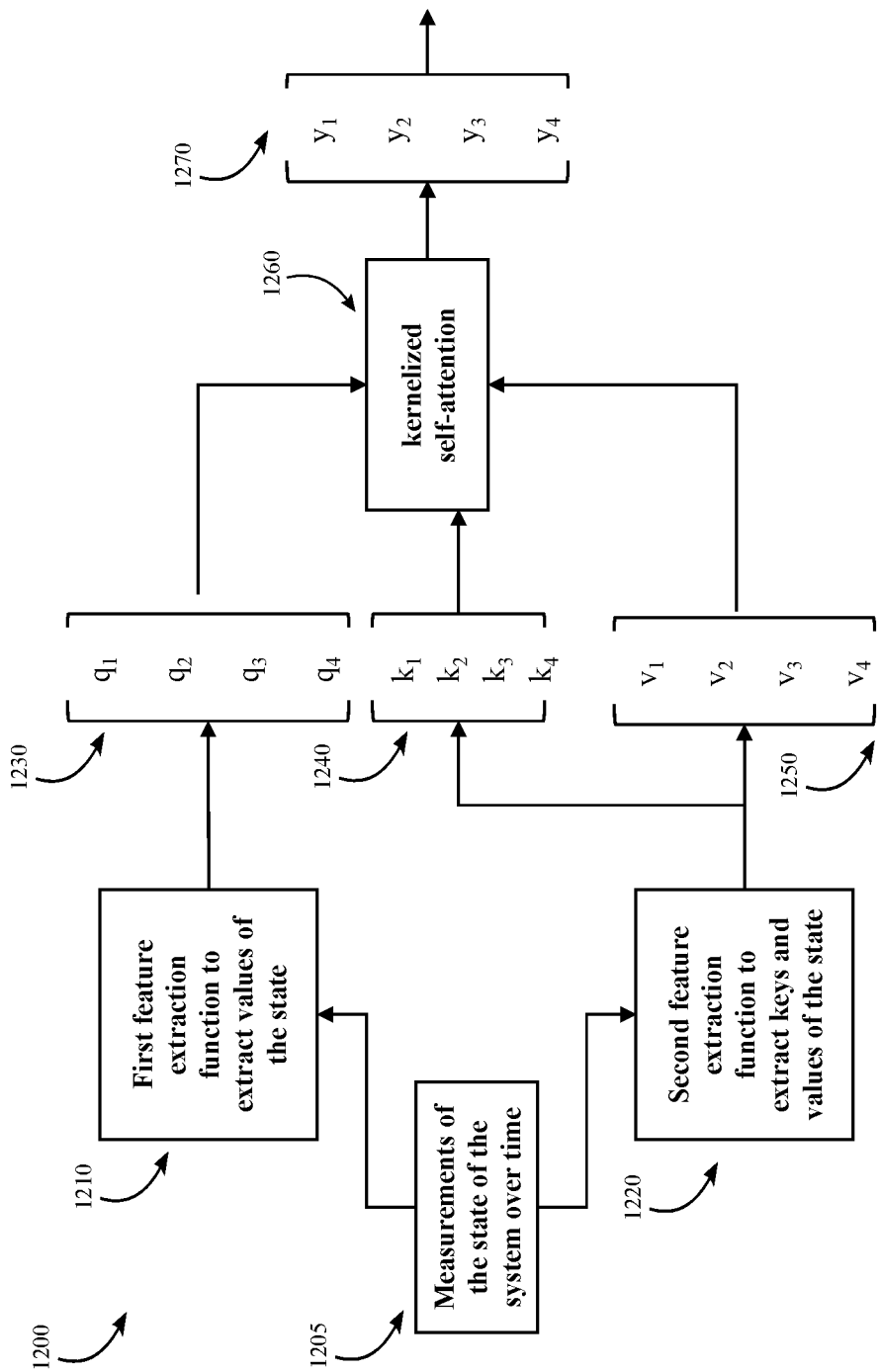
FIG. 12 shows a schematic of a method using different extraction functions for kernelized self-attention according to one embodiment.

FIG. 12 shows a schematic of a method 1200 using different extraction functions for kernelized self-attention according to one embodiment. The embodiment discloses an artificial intelligence (AI) system with kernelized self-attention 1260 for controlling a dynamic system having its state varying over time, the AI system comprising: at least one processor; and memory having instructions stored thereon that, when executed by the at least one processor, cause the AI system to: collect time-series data 1205 indicative of measurements of a sequence of state instances representing a state of a system at different instances of time; extract a value of each of the state instances from the time-series data using a first extraction function 1210; extract a key and a query of each of the state instances from the time-series data using a second extraction function 1220, such that the value of a state instance is different from the key and the query of the state instance; execute a kernelized self-attention module 1260 employing a self-attention mechanism that modifies the value 1250 of each of the state instances using the values of the state instances weighted with weights determined based on similarity of the query 1230 of the state instance with the keys 1240 of the state instances; and execute a control action based on the modified values 1270 of the state instances.

A possible setup of embodiment described in FIG. 12, is to define the similarity kernel in 308 and 312 using features from the normal sequence, as described in 1260. Such a method will take initial features 1210 from some part of the sequence, which will be the queries 1230. The keys 1240 are features produced from a different part of the sequence 1220. The values 1250 are features of the keys produced by a neural network model 1290. The kernelized self-attention 1260 will compute kernel similarities between the queries and the keys, and produce scores that are used to weight the values 1250. Thus, this set of kernel linear combinations comprise a set of all features 1270 that are linear combinations of features from normal sequences as captured by the similarity kernel. Given an anomaly sequence of features, one could compute a linear combination of abnormal features using kernel similarities computed on abnormal features as in 1200. To detect anomalies, one could compute the nearest distance between the set with the linear combination of features in the normal set and those in the abnormal set. If this distance is greater than a threshold, one could classify the set as abnormal. The neural network 1290 is trained so that linear combination of the values are always bounded in a region of a latent space. Some embodiments of the approach could use labeled data, where the data is labeled as normal or anomalous. In this case, the neural network is trained so that the linear combination of the values will preserve the data labels.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A scene-aware video encoder system, comprising: at least one processor; and a memory having instructions stored thereon that, when executed by the at least one processor, cause the scene-aware video encoder system to:
    receive a sequence of video frames of a video of a scene;
    transform the sequence of video frames into a spatio-temporal scene graph including nodes representing one or multiple static objects and one or multiple dynamic objects in the scene, wherein an appearance and a location of each of the static objects in the scene are represented by properties of a single node of the spatio-temporal scene graph, and wherein each of the dynamic objects in the scene is represented by properties of multiple nodes of the spatio-temporal scene graph describing an appearance, a location, and a motion of each of the dynamic objects at different instances of time;
    encode the nodes of the spatio-temporal scene graph into a latent space using a spatio-temporal transformer encoding different combinations of different nodes of the spatio-temporal scene graph corresponding to different spatio-temporal volumes of the scene, wherein encoding of each node of the different nodes in each of the combinations is weighted with an attention score determined as a function of similarities of spatio-temporal locations of the different nodes in the combination; and
    output the encoded nodes of the spatio-temporal scene graph.

2. The scene-aware video encoder system of claim 1, wherein the different combinations of different nodes of the spatio-temporal scene graph are selected using a window sliding method of different spatio-temporal volumes with different spatio-temporal resolutions.

3. The scene-aware video encoder system of claim 2, wherein the processor is further configured to: compute similarity kernels for the different combinations of different nodes to determine a similarity between the different combinations of different nodes of the spatio-temporal scene graph.

4. The scene-aware video encoder system of claim 3, wherein the processor is further configured to merge the similarity kernels using a series of multilayer perceptrons (MLPs) and output final graph features of the spatio-temporal scene graph in a single feature representation.

5. The scene-aware video encoder system of claim 1, wherein the processor is configured to:
register each video frame of the sequence of video frames into a shared pseudo three-dimensional (3D) spatio-temporal space; and
create a pseudo 3D scene graph representation of the sequence of video frames, upon registration of each video frame of the sequence of video frames,
wherein the pseudo 3D scene graph representation is embedded into the spatio-temporal scene graph in the latent space.

6. The scene-aware video encoder system of claim 5, wherein the processor is further configured to:
split the spatio-temporal scene graph representation into a static sub-graph and a dynamic sub-graph, wherein the static sub-graph comprises graph nodes corresponding to one or multiple objects that are static in the scene, and the dynamic sub-graph comprises graph nodes corresponding to one or multiple objects that are in motion in the scene.

7. The scene-aware video encoder system of claim 6, wherein the processor is further configured to:
merge at least two graph nodes of the static sub-graph based on a criteria, wherein the criteria comprise one or combination of a 3D spatial-temporal proximity of the two graph nodes across the sequence of video frames that are nearby, corresponding objects of the two graph nodes have same object label, and an intersection over union of corresponding bounding boxes of the objects is above a pre-defined threshold.

8. The scene-aware video encoder system of claim 1, wherein the processor is further configured to decode a transcription of the video of the scene from the encoded nodes of the spatio-temporal scene graph in the latent space using a decoder trained with the spatio-temporal transformer.

9. The scene-aware video encoder system of claim 8, wherein the processor is further configured to:
receive a query corresponding to the video;
generate embeddings of the query using multi-headed self-attention, wherein the query is attended on hierarchical abstraction of the spatio-temporal scene graph using a multi-head attention transformer;
execute an average pooling of the embeddings; and
output query-conditioned features based on the average pooling.

10. The scene-aware video encoder system of claim 9, wherein the processor is further configured to:
predict an answer for the query based on the query-conditioned features;
compute similarities of the predicted answer with a set of candidate answers; and
output an answer representation for the query based on the computed similarities.

11. A method for performing a scene-aware video encoding, comprising:
receiving a sequence of video frames of a video of a scene;
transforming the sequence of video frames into a spatio-temporal scene graph including nodes representing one or multiple static objects and one or multiple dynamic objects in the scene, wherein an appearance and a location of each of the static objects in the scene are represented by properties of a single node of the spatio-temporal scene graph, and wherein each of the dynamic objects in the scene is represented by properties of multiple nodes of the spatio-temporal scene graph describing an appearance, a location, and a motion of each of the dynamic objects at different instances of time;
encoding the nodes of the spatio-temporal scene graph into a latent space using a spatio-temporal transformer encoding different combinations of different nodes of the spatio-temporal scene graph corresponding to different spatio-temporal volumes of the scene, wherein encoding of each node of the different nodes in each of the combinations is weighted with an attention score determined as a function of similarities of spatio-temporal locations of the different nodes in the combination; and
outputting the encoded nodes of the spatio-temporal scene graph.

12. The method of claim 11, further comprising:
selecting the different combinations of different nodes of the spatio-temporal scene graph using a window sliding method of different spatio-temporal volumes with different spatio-temporal resolutions.

13. The method of claim 12, further comprising:
computing similarity kernels for the different combinations of different nodes; and
determining a similarity between the different combinations of different nodes of the spatio-temporal scene graph based on the similarity kernels.

14. The method of claim 13, further comprising:
merging the similarity kernels using a series of multilayer perceptrons (MLPs); and
outputting final graph features of the spatial-temporal scene graph in a single feature representation.

15. The method of claim 11, further comprising:
registering each video frame of the sequence of video frames into a shared pseudo three-dimensional (3D) spatio-temporal space; and
creating a pseudo 3D scene graph representation of the sequence of video frames, upon registration of each video frame of the sequence of video frames,
wherein the pseudo 3D scene graph representation is embedded into the spatio-temporal scene graph in the latent space.

16. The method of claim 15, further comprising:
splitting the spatio-temporal scene graph representation into a static sub-graph and a dynamic sub-graph, wherein the static sub-graph comprises graph nodes corresponding to one or multiple objects that are static in the scene, and the dynamic sub-graph comprises graph nodes corresponding to one or multiple objects that are in motion in the scene.

17. The method of claim 16, further comprising:
merging at least two graph nodes of the static sub-graph based on a criteria, wherein the criteria comprise one or combination of a 3D spatial-temporal proximity of the two graph nodes across the sequence of video frames that are nearby, corresponding objects of the two graph nodes have same object label, and an intersection over union of corresponding bounding boxes of the objects is above a pre-defined threshold.

18. The method of claim 11, further comprising decoding a transcription of the video of the scene from the encoded nodes of the spatio-temporal scene graph in the latent space using a decoder trained with the spatio-temporal transformer.

19. The method of claim 18, further comprising:
receiving a query corresponding to the video;
generating embeddings of the query using multi-headed self-attention,
wherein the query is attended on hierarchical abstraction of the spatio-temporal scene graph using a multi-head attention transformer;
executing an average pooling of the embeddings; and
outputting query-conditioned features based on the average pooling.

20. The method of claim 19, further comprising:
predicting an answer for the query based on the query-conditioned features;
computing similarities of the predicted answer with a set of candidate answers; and
outputting an answer representation for the query based on the computed similarities.

* * * * *